United States Patent
Takahashi et al.

(10) Patent No.: US 9,090,258 B2
(45) Date of Patent: Jul. 28, 2015

(54) VEHICLE MOTION CONTROL APPARATUS AND VEHICLE MOTION CONTROL SYSTEM

(75) Inventors: Junya Takahashi, Tokyo (JP); Makoto Yamakado, Tokyo (JP); Shinjiro Saito, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/116,701

(22) PCT Filed: May 11, 2011

(86) PCT No.: PCT/JP2011/002604
§ 371 (c)(1),
(2), (4) Date: Feb. 3, 2014

(87) PCT Pub. No.: WO2012/153367
PCT Pub. Date: Nov. 15, 2012

(65) Prior Publication Data
US 2014/0180554 A1    Jun. 26, 2014

(51) Int. Cl.
*B60W 30/00* (2006.01)
*B60W 30/02* (2012.01)
(Continued)

(52) U.S. Cl.
CPC ............. *B60W 30/02* (2013.01); *B60W 30/143* (2013.01); *B60W 30/18009* (2013.01);
(Continued)

(58) Field of Classification Search
None
See application file for complete search history.

(56) References Cited

U.S. PATENT DOCUMENTS

2005/0159853 A1 * 7/2005 Takahashi et al. ............... 701/1
2006/0089234 A1   4/2006 Ogawa
(Continued)

FOREIGN PATENT DOCUMENTS

JP    09-272419      10/1997
JP    2000-233730    8/2000
(Continued)

OTHER PUBLICATIONS

Yamakado, Makoto, et al.; Proposal of the Longitudinal Driver Model in Coordination with Vehicle Lateral Motion Based upon Jerk Information—a Driver Model Derives from Volintary Driving that has Vehicle Dynamic Rationality; International Journal of Automotive Engineering, vol. 39 No. 3, May 2008; pp. 53-58.
(Continued)

*Primary Examiner* — Jonathan M Dager
(74) *Attorney, Agent, or Firm* — Foley & Lardner LLP

(57) ABSTRACT

In order to propose a vehicle motion control apparatus providing a good operability for a driver and capable of reducing a pedal operation, motional state information acquiring means configured to acquire longitudinal acceleration, lateral acceleration, and a vehicle speed generated in a vehicle; pedal operating amount acquiring means configured to acquire pedal operation information performed by the driver; and vehicle motion control command calculating means configured to calculate a longitudinal acceleration command value on the basis of information acquired therefrom and output a command value realizing the calculated longitudinal acceleration command value are provided, and the vehicle motion control command calculating means is configured to calculate the longitudinal acceleration command value on the basis of the acquired information so as to generate longitudinal acceleration which provides a longitudinal jerk of a value comparable to a longitudinal jerk on the basis of a pedal opening operation performed by the driver.

20 Claims, 17 Drawing Sheets

(51) Int. Cl.
  *B60W 30/14*     (2006.01)
  *B60W 30/18*     (2012.01)
  *B60W 40/10*     (2012.01)

(52) U.S. Cl.
  CPC ........ *B60W 40/10* (2013.01); *B60W 30/18145* (2013.01); *B60W 2520/10* (2013.01); *B60W 2520/125* (2013.01); *B60W 2540/10* (2013.01); *B60W 2720/106* (2013.01)

(56) References Cited

U.S. PATENT DOCUMENTS

| | | | | |
|---|---|---|---|---|
| 2008/0294321 | A1* | 11/2008 | Yamakado et al. | 701/93 |
| 2009/0030574 | A1* | 1/2009 | Yamakado et al. | 701/44 |
| 2009/0054202 | A1* | 2/2009 | Yamakado et al. | 477/6 |
| 2009/0112404 | A1* | 4/2009 | Imura et al. | 701/41 |
| 2009/0143951 | A1* | 6/2009 | Takahashi et al. | 701/70 |
| 2009/0192675 | A1* | 7/2009 | Yamakado et al. | 701/38 |
| 2010/0055649 | A1* | 3/2010 | Takahashi et al. | 434/66 |
| 2010/0292904 | A1* | 11/2010 | Taguchi et al. | 701/93 |
| 2011/0187515 | A1* | 8/2011 | Saito et al. | 340/425.5 |
| 2011/0231033 | A1* | 9/2011 | Yamakado et al. | 701/1 |
| 2012/0101657 | A1* | 4/2012 | Yamakado et al. | 701/1 |
| 2012/0130612 | A1* | 5/2012 | Watanabe et al. | 701/70 |
| 2012/0179349 | A1* | 7/2012 | Yamakado et al. | 701/89 |
| 2012/0209489 | A1* | 8/2012 | Saito et al. | 701/70 |
| 2012/0323445 | A1* | 12/2012 | Yamakado et al. | 701/38 |
| 2013/0131947 | A1* | 5/2013 | Takahashi et al. | 701/70 |
| 2014/0129090 | A1* | 5/2014 | Yamakado et al. | 701/41 |
| 2014/0145498 | A1* | 5/2014 | Yamakado et al. | 303/3 |
| 2014/0222309 | A1* | 8/2014 | Yamakado et al. | 701/89 |

FOREIGN PATENT DOCUMENTS

| | | |
|---|---|---|
| JP | 2006-118485 A | 5/2006 |
| JP | 2008-285066 A | 11/2008 |
| JP | 2009-051487 A | 3/2009 |
| WO | WO 2011-36810 A1 | 3/2011 |

OTHER PUBLICATIONS

PCT International Search Report on application PCT/JP2011/002604 mailed Aug. 16, 2011; 1 page.

* cited by examiner

VEHICLE MOTION CONTROL APPARATUS AND VEHICLE MOTION CONTROL SYSTEM

TECHNICAL FIELD

The present invention relates to a vehicle motion control apparatus and a vehicle motion control system configured to accelerate and decelerate a vehicle so as to achieve a preferable motional state of the vehicle.

BACKGROUND ART

In the related art, as a vehicle motion control system configured to reduce an operational load of a driver, a system configured to perform deceleration instead of the driver when lateral acceleration generated in the vehicle is higher than a set value from curve information of a navigation system or the lateral acceleration at the time of turning is known (for example, see JP-A-2009-51487).

Since the curve information is acquired in the vehicle motion control system in this configuration, an apparatus configured to acquire a course shape such as image pickup means such as a global positioning system (GPS) or a camera is necessary, and hence the price is high.

As a system for controlling acceleration and deceleration without the necessity of such an apparatus, a method of creating acceleration and deceleration on the basis of lateral jerk generated by an operation by the driver is proposed (for example, JP-A-2008-285066, International Journal of Automotive Engineering Vol 39, No. 3, 2008).

With this method, acceleration and deceleration in the same manner as a skilled driver may be performed without setting a time change of deceleration for every curve. Accordingly, when driving through continuous curves, the number of braking operations of the driver may be reduced, so that the operational load for the driver may be reduced.

In view of reduction of step changing operations of an accelerator pedal and a brake pedal performed by the driver, as a method of generating deceleration by the operation of the accelerator pedal, a method of adding deceleration on the basis of a travelling state (in the town, windings in the suburbs) (for example, JP-A-9-272419) and a method of adding deceleration according to the position of the accelerator pedal (for example, JP-A-2000-233730) are proposed. In these methods, deceleration may be generated only with an operation of the accelerator pedal.

SUMMARY OF INVENTION

Technical Problem

However, deceleration in accordance with the traveling state does not necessarily become the deceleration intended by the driver, and the driver is required always to operate the accelerator pedal for controlling the deceleration in deceleration in accordance with the position of the accelerator pedal.

In view of such circumstances, it is an object of the present invention to propose a vehicle motion control apparatus and a vehicle motion control system providing good operability for a driver and capable of reducing the pedal operation.

In order to solve the problem, a vehicle motion control apparatus includes: motional state information acquiring means configured to acquire a longitudinal acceleration, a lateral acceleration, and a vehicle speed generated in a vehicle; pedal operating amount acquiring means configured to acquire pedal operation information performed by a driver; and vehicle motion control command calculating means configured to calculate a longitudinal acceleration command value on the basis of information acquired from the motional state information acquiring means and the pedal operating amount acquiring means and output a command value realizing the calculated longitudinal acceleration command value, and is configured in such a manner that the vehicle motion control command calculating means is configured to calculate the longitudinal acceleration command value on the basis of the acquired information so as to generate longitudinal acceleration which provides a longitudinal jerk of a value comparable to a longitudinal jerk on the basis of a pedal opening operation performed by the driver.

Also, a vehicle motion control system of the present invention includes: a vehicle motion control apparatus including: motional state information acquiring means configured to acquire a longitudinal acceleration, a lateral acceleration, and a vehicle speed generated in a vehicle; pedal operating amount acquiring means configured to acquire pedal operation information performed by a driver; and vehicle motion control command calculating means configured to calculate a longitudinal acceleration command value on the basis of information acquired from the motional state information acquiring means and the pedal operation amount acquiring means and output a command value for realizing the calculated longitudinal acceleration command value; longitudinal acceleration generating means configured to perform longitudinal acceleration control on the vehicle on the basis of the command value output from the vehicle motion control command calculating means; and longitudinal acceleration control state display means configured to indicate information recognizable by the driver on the basis of the command value output from the vehicle motion control command calculating means, and is configured in such a manner that the vehicle motion control command calculating means is configured to calculate the longitudinal acceleration command value on the basis of the acquired information so as to generate a longitudinal acceleration which provides a longitudinal jerk of almost a value comparable to a longitudinal jerk on the basis of a pedal opening operation performed by the driver.

DESCRIPTION OF EMBODIMENTS (Method of Controlling Longitudinal Acceleration on the Basis of Accelerator Pedal Operation)

In the present invention, control of the longitudinal acceleration is performed on the basis of longitudinal jerk generated by a pedal operation by a driver. Prior to describing embodiments, a method of controlling a negative longitudinal acceleration, that is, deceleration on the basis of the longitudinal jerk generated by an accelerator pedal operation by the driver will be described below with reference to FIG. 1 to FIG. 5 so as to facilitate understanding of the present invention. In this specification, the longitudinal acceleration is assumed to be positive on the acceleration side, and negative on the deceleration side.

Figure 1:
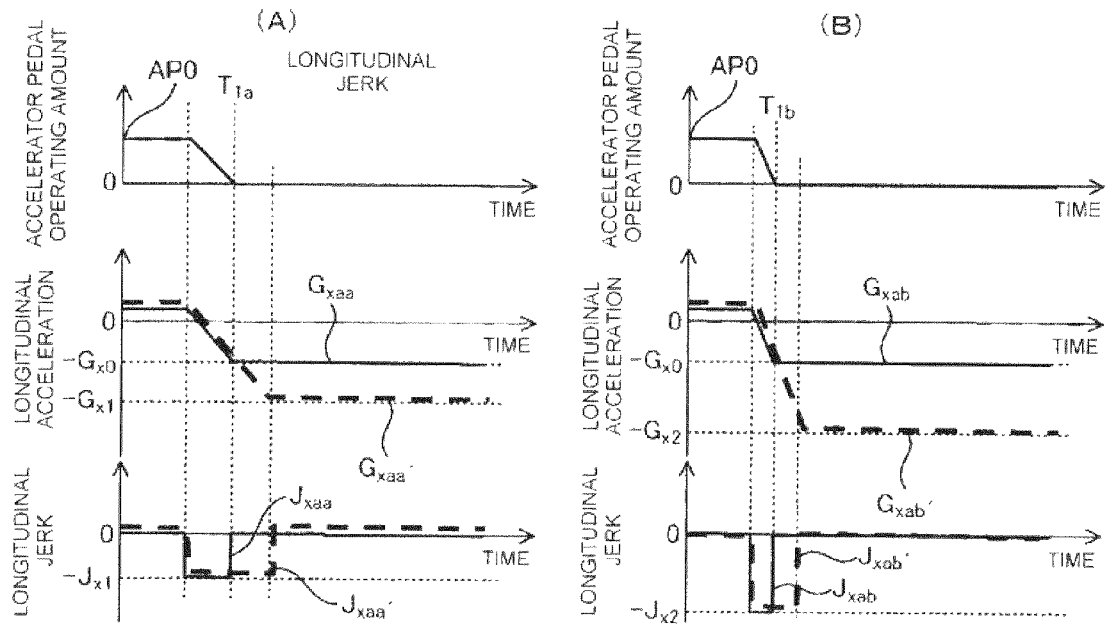
FIG. 1 is a drawing illustrating a concept at the time of deceleration control by a longitudinal acceleration command value of the present invention.

FIG. 1 is a conceptual drawing at the time of deceleration control by a longitudinal acceleration command value of the present invention.

FIG. 1 shows longitudinal accelerations ($G_{xa}$, $G_{xb}$) and longitudinal jerks ($J_{xa}$, $J_{xb}$) generated when an accelerator pedal is started to be opened from an accelerator pedal position where a certain accelerator pedal operating amount (AP) is AP0 and reaches the accelerator pedal operating amount of "0".

Accelerator pedal operating speed is different in FIGS. 1(A) and (B), and the accelerator pedal operating speed in FIG. 1(B) is higher than that in FIG. 1(A). Reference sign $G_{xaa}$ in FIG. 1(A) and reference sign $G_{xab}$ in FIG. 1(B) denote respectively longitudinal accelerations generated when no control is performed, and reference sign $J_{xaa}$ in FIG. 1(A) and $J_{xab}$ in FIG. 1(B) denote longitudinal jerks at this time. As illustrated in FIGS. 1(A) and (B), values of the longitudinal jerk generating when the accelerator pedal is opened are different because the accelerator pedal operating speeds are different such as $-J_{x1}$ and $-J_{x2}$, but the longitudinal accelerations $G_{xaa}$, $G_{xab}$ finally become a comparable value, $-G_{x0}$.

In the present invention, a difference between $J_{xaa}$ and $J_{xab}$ is focused, and the longitudinal acceleration different depending on the difference between $J_{xaa}$ and $J_{xab}$ are added, and the finally generated longitudinal acceleration is changed.

Specifically, as illustrated in FIGS. 1(A) and (B), longitudinal accelerations $G_{xaa}'$, $G_{xab}'$ with which longitudinal jerks $J_{xaa}'$, $J_{xab}'$ generated by control at the time of termination of the opening operation of the accelerator pedal $T_{1a}$ and $T_{1b}$ become values comparable to the longitudinal jerk $-J_{x1}$, $-J_{x2}$ generated by the pedal operation by the driver.

Also, the longitudinal acceleration is added so that $G_{xaa}'$ finally becomes $-G_{x1}$, and $G_{xab}'$ becomes $-G_{x2}$, where the final magnitudes of $G_{xaa}'$ and $G_{xab}'$ are different depending on the magnitude of $-J_{x1}$ and $-J_{x2}$, and an absolute value of the finally generated longitudinal acceleration increases with an increase of the absolute values of the $-J_{x1}$ and $-J_{x2}$. In other words, the absolute value of a calculated longitudinal acceleration command value $G_{xcmd}$ increases with an increase of the absolute value of the longitudinal jerk on the basis of the pedal opening operation of the driver.

Accordingly, an area of the longitudinal acceleration which can be generated by the accelerator pedal operation may be increased, and the driver is capable of controlling the magnitude of the finally generated longitudinal acceleration by controlling the longitudinal jerk generated when the accelerator pedal is opened. Also, by calculating the longitudinal acceleration command value so as to generate the longitudinal jerk which becomes the value comparable to the longitudinal jerk generated by the driver, that is, to generate the longitudinal acceleration which is comparable to the longitudinal jerk on the basis of the pedal opening operation by the driver, a longitudinal acceleration control without a feeling of discontinuity is achieved, so that the feeling of the driver may be improved.

In the present invention, a negative longitudinal acceleration generated on the basis of the accelerator pedal operation by the driver ($G_{xaa}'$ in FIG. 1(A) or $G_{xab}'$ in FIG. 1(A)) changes on the basis of the accelerator pedal operating amount by the driver, a brake pedal operating amount by the driver, lateral jerk generated by a handle operation of the driver, or a vehicle speed.

Figure 2:
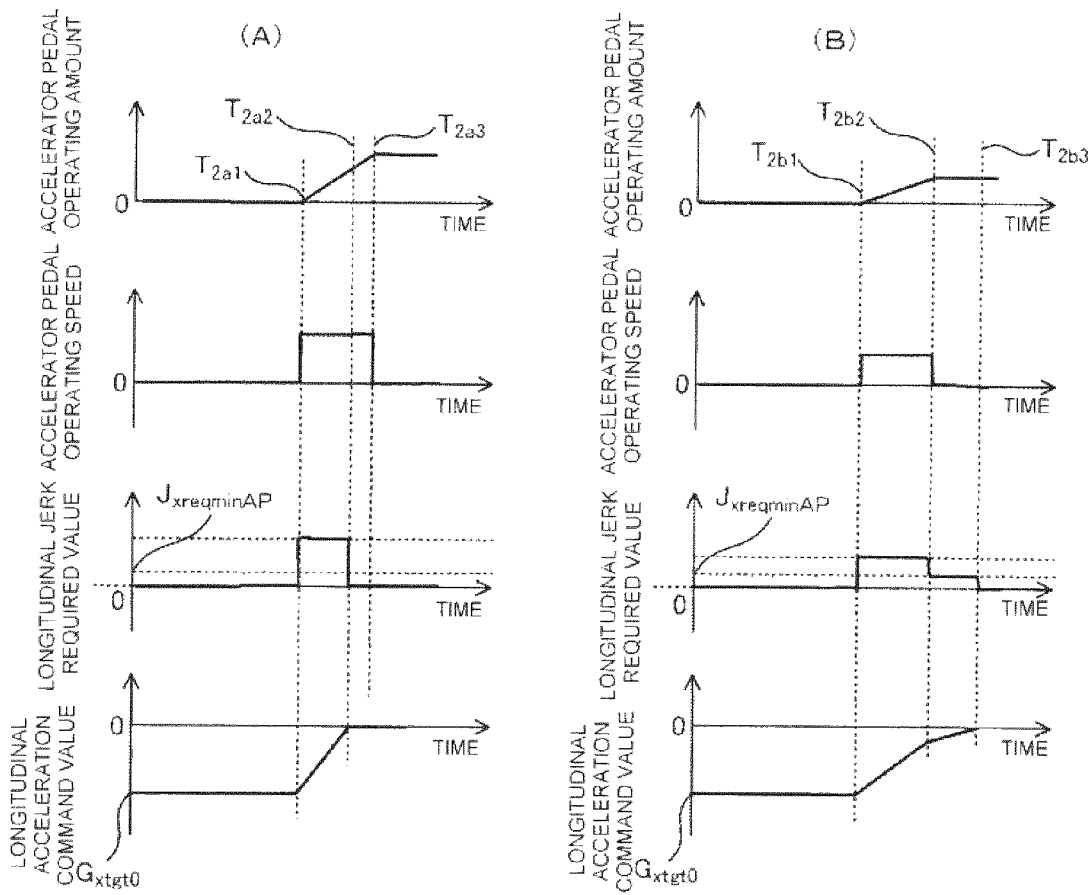
FIG. 2 is a drawing illustrating a concept of a change of a longitudinal acceleration command value when a driver operates an accelerator pedal during deceleration on the basis of the longitudinal acceleration command value of the present invention.

FIG. 2 illustrates a conceptual drawing of a change of the longitudinal acceleration command value when the driver operates the accelerator pedal during deceleration in which the value of the longitudinal acceleration command value $G_{xcmd}$ becomes $G_{xtgt0}$.

In the present invention, a longitudinal jerk required value (acceleration) $J_{xreqAP}$ is created from a temporal change of the accelerator pedal operating amount (AP) by the driver, that is, the accelerator pedal operating speed, and the longitudinal acceleration command value $G_{xcmd}$ is changed on the basis of the longitudinal jerk required value (acceleration) $J_{xreqAP}$.

As illustrated in FIGS. 2(A) and (B), when the accelerator pedal operating amount is increased by the change, the longitudinal jerk required value (acceleration) $J_{xreqAP}$ having a positive value is created. Here, the longitudinal jerk required value (acceleration) $J_{xreqAP}$ increases with an increase of the accelerator pedal operating speed. Under the condition that the accelerator pedal operating speed is positive as shown from $T_{2a1}$ to $T_{2a3}$ in FIG. 2(A), when the longitudinal acceleration command value $G_{xcmd}$ becomes 0 as shown at $T_{2a2}$ in FIG. 2(A), the longitudinal jerk required value (acceleration) $J_{xreqAP}$ is set to 0, and deceleration control by the longitudinal acceleration command value $G_{xcmd}$ is terminated. Under the condition that the accelerator pedal operating speed is positive as shown from $T_{2b1}$ to $T_{2b2}$ in FIG. 2(B), when the accelerator pedal operating amount is positive and the longitudinal acceleration command value $G_{xcmd}$ is not 0 as shown at $T_{2b2}$ in FIG. 2(B), the longitudinal acceleration command value $G_{xcmd}$ is changed with a longitudinal jerk required value $J_{xreqminAP}$ as a minimum value of the longitudinal jerk required value (acceleration) $J_{xreqAP}$ and when the longitudinal acceleration command value $G_{xcmd}$ becomes 0 as shown at $T_{2b3}$ in FIG. 2(B), the longitudinal jerk required value (acceleration) $J_{xreqAP}$ is set to 0.

Accordingly, when the driver operates the accelerator pedal during deceleration by the longitudinal acceleration command value $G_{xcmd}$, even when the operating speed of the accelerator pedal is small, the longitudinal acceleration command value $G_{xcmd}$ may be set to 0, so that acceleration in accordance with the accelerator pedal operating amount is enabled.

Figure 3:
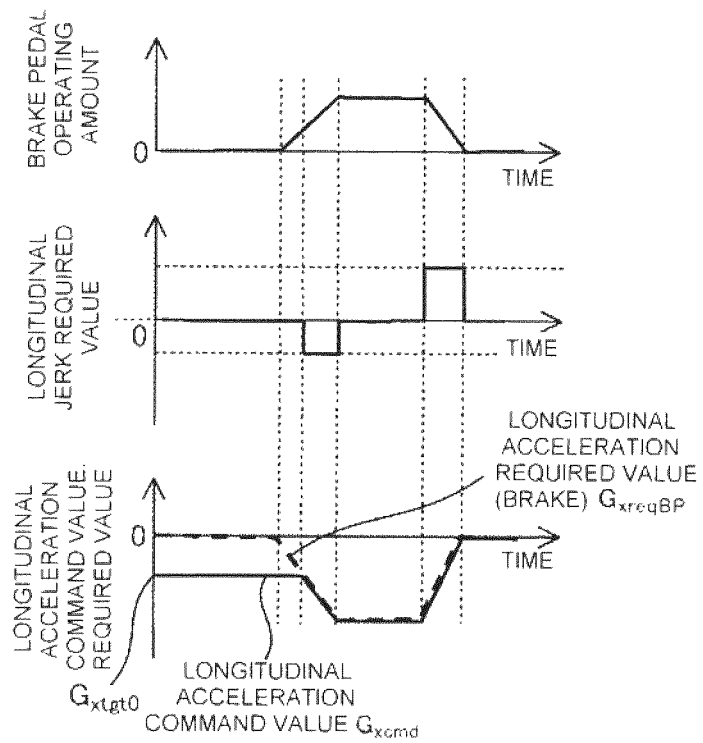
FIG. 3 is a drawing illustrating a concept of a longitudinal acceleration command value when the driver operates a brake pedal during deceleration on the basis of the longitudinal acceleration command value of the present invention.

FIG. 3 illustrates a conceptual drawing of the longitudinal acceleration command value $G_{xcmd}$ when the driver operates a brake pedal during deceleration in which the value of the longitudinal acceleration command value $G_{xcmd}$ becomes $G_{xtgt0}$.

In the present invention, a longitudinal acceleration required value (brake) $G_{xreqBP}$ is created from a brake pedal operating amount (BP) of the driver, and if an absolute value of $G_{xreqBP}$ is not less than the absolute value of the longitudinal acceleration command value $G_{xcmd}$, a longitudinal jerk required value (brake) $J_{xreqBP}$ is created from the temporal change of $G_{xreqBP}$ to change the longitudinal acceleration command value $G_{xcmd}$ on the basis of the longitudinal jerk required value (brake) $J_{xreqBP}$. In other words, when the longitudinal acceleration command value is a negative value (deceleration), the absolute value of the longitudinal acceleration required value (brake) $G_{xreqBP}$ generated by the brake pedal operating amount (BP) is not less than the absolute value of the longitudinal acceleration command value $G_{xcmd}$, the absolute value of the longitudinal acceleration command value $G_{xcmd}$ is reduced on the basis of reduction of the brake pedal operating amount (BP).

Accordingly, when an attempt is made to generate deceleration not lower than the deceleration generated by longitudinal acceleration control by operating the brake pedal by the driver during the deceleration on the basis of the longitudinal acceleration command value $G_{xcmd}$, deceleration in accordance with the brake pedal operation by the driver is enabled.

Figure 4:
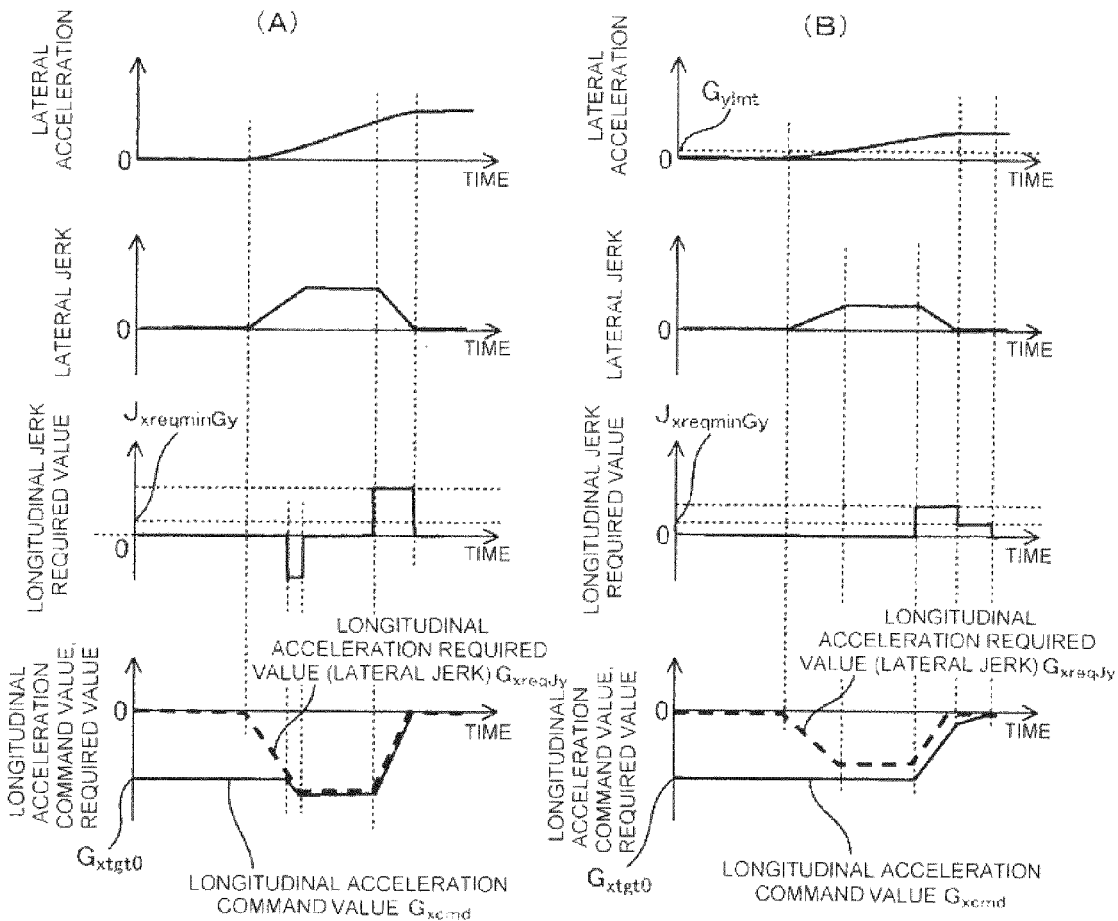
FIG. 4 is a drawing illustrating a concept of a longitudinal acceleration command value when the driver operates a handle and generates lateral acceleration during deceleration on the basis of the longitudinal acceleration command value of the present invention.

FIG. 4 illustrates a conceptual drawing of the longitudinal acceleration command value $G_{xcmd}$ when the driver operates the handle and lateral acceleration is generated during deceleration in which the value of the longitudinal acceleration command value $G_{xcmd}$ becomes $G_{xtgt0}$.

In the present invention, the absolute value of the longitudinal acceleration command value is changed on the basis of the lateral jerk. Specifically, a longitudinal acceleration required value (lateral jerk) $G_{xreqJy}$ is created from the lateral jerk generated by the driver and if an absolute value of $G_{xreqJy}$ is not lower than the absolute value of the longitudinal acceleration command value $G_{xcmd}$, as illustrated in FIG. 4(A), a longitudinal jerk required value (lateral jerk) $J_{xreqJy}$ is created from the temporal change of $G_{xreqJy}$ and the longitudinal acceleration command value $G_{xcmd}$ is changed on the basis of the longitudinal jerk required value (lateral jerk) $J_{xreqJy}$.

If the absolute value of the longitudinal acceleration required value (lateral jerk) $G_{xreqJy}$ is smaller than the absolute value of the longitudinal acceleration command value $G_{xcmd}$, as illustrated in FIG. 4(B), only a positive component of the temporal change of the longitudinal acceleration required value (lateral jerk) $G_{xreqJy}$ is set to be the longitudinal jerk required value (lateral jerk) $J_{xreqJy}$ and, if the absolute value of the lateral acceleration is not lower than a predetermined value $G_{ylmt}$ and the longitudinal acceleration command value $G_{xcmd}$ is not 0, the longitudinal acceleration command value is changed with $J_{xreqminGy}$ as a minimum value of the longitudinal jerk required value (lateral jerk) $J_{xreqJy}$. Here, a method of creating $G_{xreqJy}$ from the lateral jerk is proposed in International Journal of Automotive Engineering Vol 39, No. 3, 2008.

Accordingly, when the driver operates the handle during the control of the deceleration by the longitudinal acceleration command value $G_{xcmd}$, the longitudinal acceleration command value $G_{xcmd}$ is changed on the basis of the generated lateral jerk, so that deceleration in conjunction with a lateral motion is enabled.

Figure 5:
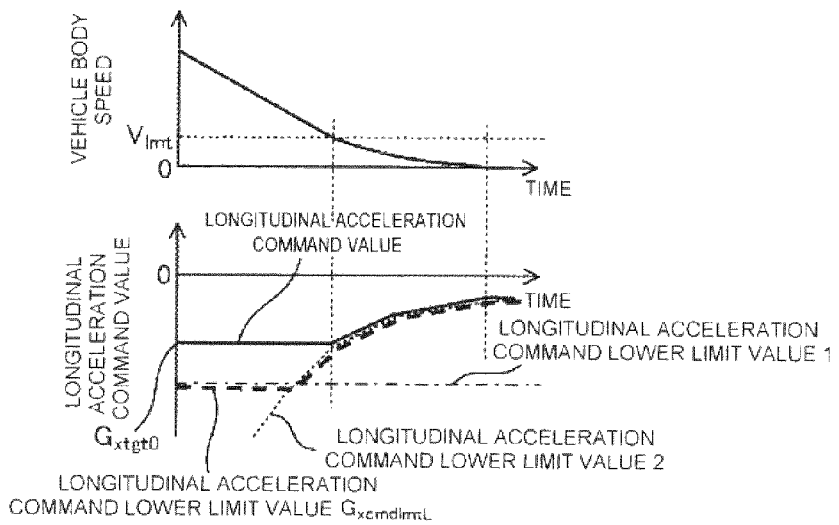
FIG. 5 is a drawing illustrating a concept of a change of a longitudinal acceleration command value when a vehicle speed is lowered during deceleration on the basis of the longitudinal acceleration command value of the present invention.

FIG. 5 illustrates a conceptual drawing of a change of the longitudinal acceleration command value when a vehicle speed V is lowered by deceleration in which the value of the longitudinal acceleration command value $G_{xcmd}$ becomes $G_{xtgt0}$.

In the present invention, when the longitudinal acceleration command value is a negative value (deceleration) and the vehicle speed is not higher than a predetermined vehicle speed, the absolute value of the longitudinal acceleration command value is set so as to be reduced with a reduction of the vehicle speed, specifically, so that the absolute value of the longitudinal acceleration command value $G_{xcmd}$ at the time of deceleration control is reduced with lowering of the vehicle speed V in an area in which the vehicle speed V is not higher than a preset value of vehicle speed $V_{lmt}$. As this method, for example, as illustrated in FIG. 5, the absolute value of the longitudinal acceleration command value can be reduced with lowering of the vehicle speed V by setting a longitudinal acceleration command lower limit value $G_{xcmdlmtL}$, which is a lower limit value of the longitudinal acceleration command value $G_{xcmd}$, to include a longitudinal acceleration command lower limit value 2 set so that the absolute value of the longitudinal acceleration command lower limit value is reduced with lowering of the vehicle speed V in addition to a longitudinal acceleration command lower limit value 1 set independent from the vehicle speed, and setting the value of one of the longitudinal acceleration command lower limit value 1 and the longitudinal acceleration command lower limit value 2 having a smaller absolute value as the longitudinal acceleration command lower limit value $G_{xcmdlmtL}$.

Accordingly, when the vehicle stops by deceleration control on the basis of the longitudinal acceleration command value $G_{xcmd}$, the occurrence of an abrupt longitudinal acceleration change may be suppressed.

As described thus far, in the present invention, the negative longitudinal acceleration, that is, the deceleration may be generated in the vehicle on the basis of the longitudinal jerk generated by the operation of the accelerator pedal by the driver, and furthermore, the generated deceleration is changed in accordance with the accelerator pedal operation, the brake pedal operation, or the handle operation performed by the driver, a constant deceleration is performed unless the driver performs any input operation during the deceleration control (if the vehicle speed is larger than a certain value), and if the driver performs any input operation, deceleration control according to the input is performed.

By varying the deceleration in accordance with the longitudinal jerk when the accelerator pedal is opened in this manner, the driver is capable of controlling the deceleration to be generated instinctively, and in addition, the operation to maintain the deceleration constant is performed by control, so that the operating load of the driver may be reduced.

Accordingly, when travelling on a continuous curved road such as windings in the suburbs for example, the driver is capable of generating required deceleration by controlling the longitudinal jerk at the time of opening of the accelerator pedal before the curve instead of performing actions of step changing from the accelerator pedal to the brake pedal before a curve, decelerating operation by means of the brake pedal, handle operation in accordance with the curve, and pressing of the accelerator pedal again as in the related art and, in addition, the deceleration may vary in accordance with the handle operation performed when turning along the curve, so that the step changing operation between the accelerator pedal and the brake pedal may be reduced.

In a case of travelling while following after vehicles ahead, in which acceleration and deceleration are repeated in the towns, the driver may change the generated deceleration occurring by the control of the longitudinal jerk at the time of opening of the accelerator pedal, and may reduce the step changing operation between the pedals.

(First Embodiment for Carrying Out the Invention)

Hereinafter, with reference to FIG. 6 to FIG. 12, a configuration and an action of a vehicle motion control apparatus according to a first embodiment of the present invention will be described.

Figure 6:
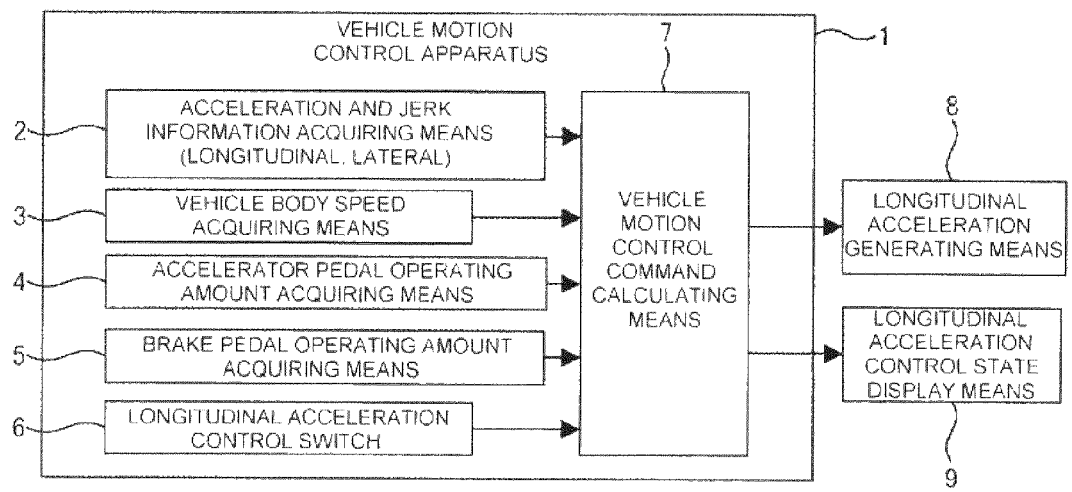
FIG. 6 is a system block diagram illustrating a first embodiment of a vehicle motion control apparatus according to the present invention.

FIG. 6 is a block diagram of a vehicle motion control system having a vehicle motion control apparatus 1 according to the first embodiment of the present invention.

The vehicle motion control apparatus 1 of this embodiment is to be mounted on a vehicle, and includes an acceleration and jerk information acquiring means 2, a vehicle speed acquiring means 3, an accelerator pedal operating amount acquiring means 4, a brake pedal operating amount acquiring means 5, a longitudinal acceleration control switch 6, and a vehicle motion control command calculating means 7, and performs signal output to a longitudinal acceleration generating means 8 and a longitudinal acceleration control state display means 9. The acceleration and jerk information acquiring means 2 and the vehicle speed acquiring means 3 are collectively referred as motional state information acquiring means and the accelerator pedal operating amount acquiring means 4 and the brake pedal operating amount acquiring means 5 are collectively referred to as pedal operating amount acquiring means. Therefore, the motional state information acquiring means is configured to acquire longitudinal acceleration, lateral acceleration and a vehicle speed generated in the vehicle, and the pedal operating amount acquiring means is configured to acquire pedal operation information such as accelerator pedal strokes, brake pressures, and the like performed by the driver.

The acceleration and jerk information acquiring means 2 is means for acquiring the longitudinal acceleration, the lateral acceleration, longitudinal jerk, and lateral jerk generated in the vehicle.

As a method of acquiring the longitudinal acceleration and the lateral acceleration, a value directly detected by a sensor or the like may be acquired, or a result of calculation performed by other electronic controller via communication may be acquired.

As a method of acquiring the longitudinal jerk and the lateral jerk, the value directly detected by a sensor or the like may be acquired, or the result of calculation performed by other electronic controller via communication may be acquired. Here, the longitudinal jerk and the lateral jerk need not to be acquired by the acceleration and jerk information acquiring means 2, and the longitudinal jerk and the lateral jerk may be created by applying differential processing to the obtained longitudinal acceleration and the lateral acceleration by the vehicle motion control command calculating means 7.

Also, a method of estimating the longitudinal acceleration and the longitudinal jerk from the accelerator pedal operating amount obtained by the accelerator pedal operating amount acquiring means 4 or from the brake pedal operating amount obtained by the brake pedal operating amount acquiring means 5 may be employed instead of the above-described method.

As regards the lateral acceleration, a method of acquiring a steering angle of the handle operation by the driver or a yaw rate, which is a rotating speed in the direction of turning of the vehicle, and estimating the lateral acceleration by using a vehicle model by the vehicle motion control command calculating means 7 may be employed instead of the above-described method.

The vehicle speed acquiring means 3 is means for acquiring a vehicle speed, which is a speed of movement of the vehicle. As the vehicle speed acquiring means, a method of acquiring a value sensed by a ground speed measuring sensor using millimeter waves or acquiring a result of calculation of other electronic controllers by communication is applicable. A method of acquiring an own vehicle position by a grovel positioning system (GPS) and estimating from a temporal change of the own vehicle position obtained by the vehicle motion control command calculating means 7, or a method of acquiring rotating speeds of the respective wheels and estimating the vehicle speed from the obtained rotating speeds acquired by the vehicle motion control command calculating means 7 and the diameter of the tire may be applied instead of detecting the vehicle speed directly.

The accelerator pedal operating amount acquiring means 4 is means for acquiring the accelerator pedal stroke or the accelerator pedal operating amount by the driver.

As the accelerator pedal operating amount acquiring means, a method of acquiring a value detected by an accelerator pedal stroke sensor as the accelerator pedal operating amount or a method of acquiring a value detected by an accelerator pedal step pressure sensor as the accelerator pedal operating amount, or acquiring a result calculated by other electronic controllers by communication is applicable.

Alternatively, a method of acquiring a throttle opening and estimating from the throttle opening acquired by the vehicle motion control command calculating means 7 instead of detecting the accelerator pedal operating amount directly, or creating the accelerator pedal operating amount by the vehicle motion control command calculating means 7 on the basis of a value or values acquired by one of the accelerator pedal stroke sensor and the accelerator pedal pressure sensor or both is applicable.

The brake pedal operating amount acquiring means 5 is means for acquiring the break pressure or the brake pedal operating amount by the driver.

As the brake pedal operating amount acquiring means, a method of acquiring a value detected by a brake pedal stroke sensor as the brake pedal operating amount, a method of acquiring a value detected by a brake pedal pressure sensor as the brake pedal operating amount, a method of acquiring a value detected by a brake pressure sensor as the brake pedal operating amount, or acquiring a result calculated by the other electronic controllers by communication is applicable.

Alternatively, creating the brake pedal operating amount by the vehicle motion control command calculating means 7 on the basis of one or at least two of values acquired by the brake pedal stroke sensor, by the brake pedal pressure sensor, and by the brake pressure sensor is also applicable.

The accelerator pedal stroke or the accelerator pedal operating amount acquired by the accelerator pedal operating amount acquiring means 4 and the braked pressure or the brake pedal operating amount acquired by the brake pedal operating amount acquiring means 5 are collectively referred to as pedal operation information.

The longitudinal acceleration control switch 6, which is a longitudinal acceleration control detecting means, is a switch configured to detect On or OFF of the longitudinal acceleration control of the present invention and output a longitudinal acceleration control detection signal. Here, the longitudinal acceleration control switch 6 is not a switch to be independently installed, but may be those operated in conjunction with other inputs. For example, when providing a mode change-over switch for changing responsiveness of an engine for inputs of the accelerator pedal, the longitudinal acceleration control may be set to ON in a mode in which the responsiveness of the engine is the highest.

It may be a switch configured to switch the longitudinal acceleration control between ON and OFF in response to an input switch operated by the driver and the shift position. For example, in the case of a vehicle having an automatic transmission, it may be a switch configured to turn the longitudinal acceleration control ON when the shift position is in a D-range and the input switch operated by the driver is ON, and turn the longitudinal acceleration control OFF under other conditions.

The process on the basis of the shift position described above may be performed so as to switch the longitudinal acceleration control between ON and OFF in the vehicle motion control command calculating means 7 by inputting shift position information to the vehicle motion control command calculating means 7.

The vehicle motion control command calculating means 7 is a calculating apparatus having a storage area, a calculation processing performance, and signal input and output means, and is configured to calculate a command value of a longitudinal acceleration to be generated in the vehicle, and send a signal to the longitudinal acceleration generating means 8 and the longitudinal acceleration control state display means 9. In the present invention, the vehicle motion control command calculating means 7 is configured to calculate the longitudinal acceleration command value on the basis of the acquired information and output a command value realizing the calculated longitudinal acceleration command value, and calculate the longitudinal acceleration command value on the basis of the acquired information so as to generate longitudinal acceleration, which provides the longitudinal jerk of almost the same level as the longitudinal jerk on the basis of the pedal opening operation performed by the driver.

The longitudinal acceleration generating means 8 is an acceleration and deceleration actuator capable of generating longitudinal acceleration in the vehicle. Examples of the above-described acceleration and deceleration actuator include an engine configured to generate longitudinal acceleration by controlling the throttle opening of the engine, a motor configured to generate longitudinal acceleration by controlling the drive torque of the motor, a transmission configured to generate longitudinal acceleration by changing a transmission ratio at the time of transmitting a motive force to respective wheels, or a friction brake configured to generate longitudinal acceleration by pressing a brake disk against a brake pad of each wheel, and one of these acceleration and deceleration actuators which is capable of realizing a longitudinal acceleration command value calculated by the vehicle motion control apparatus 1 is used as the longitudinal acceleration generating means 8.

The longitudinal acceleration control state display means 9 is an information indicator indicating information recognizable by the driver through at least one of his or her five physical senses. Examples of the information indicator include an indicator configured to provide visual perception of the driver with information such as an indication lamp or a display device, a sound generator configured to provide acoustic perception of the driver with information such as a beep sound or a voice, or a vibration generator configured to provide tactile perception of the driver with information such as vibrations of a handle, pedals, or a seat, and the indicator, the sound generator, and the vibration generator may be used in combination as the longitudinal acceleration control state display means 9.

The signal transmitted from the vehicle motion control apparatus 1 to the longitudinal acceleration generating means 8 do not have to be the longitudinal acceleration itself as long as it is a signal realizing the longitudinal acceleration command value by the acceleration and deceleration actuator. For example, when a drive controller of the acceleration and deceleration actuator is capable of controlling the acceleration and deceleration actuator so as to realize the longitudinal acceleration command value, the longitudinal acceleration command value is transmitted to the drive controller as a command signal.

When the acceleration and deceleration actuator is a hydraulic friction brake configured to press the brake pad against the brake disc by hydraulic pressure, a hydraulic command value realizing the longitudinal acceleration command value is transmitted to a hydraulic friction brake controller.

It is also possible to send a drive signal of a hydraulic friction brake drive actuator configured to realize the longitudinal acceleration command value directly to the hydraulic friction brake drive actuator without the intermediary of the hydraulic friction brake controller.

Alternatively, the acceleration and deceleration actuator configured to perform drive control in accordance with the longitudinal acceleration command value may be modified when realizing the longitudinal acceleration command value. For example, in a case where the longitudinal acceleration generating means 8 includes a regenerative brake configured to generate deceleration in the own vehicle by using a regenerative torque of the motor and the hydraulic friction brake, a regenerative torque command value and a hydraulic pressure command value may be transmitted to the regenerative brake and the hydraulic friction brake respectively so as to change the drive ratio between the regenerative brake and the hydraulic friction brake depending on the relationship of a charged state of a battery or a maximum deceleration which can be generated by the regenerative brake with respect to the longitudinal acceleration command value.

As the signal transmitted from the vehicle motion control apparatus 1 to the longitudinal acceleration control state display means 9, a signal which can drive the longitudinal acceleration control state display means 9 is transmitted on the basis of a state of control of the vehicle motion control apparatus 1 and the longitudinal acceleration command value. For example, when the longitudinal acceleration control state display means 9 is the indicator, a command value configured to illuminate an indication lamp or display on the display device in accordance with the ON/OFF state of the longitudinal acceleration control or the longitudinal acceleration command value is sent. When the longitudinal acceleration control state display means 9 is the sound generator, a command value configured to guide by using a beep sound or a voice on the basis of the longitudinal acceleration generated in the vehicle is sent. When the longitudinal acceleration control state display means 9 is the vibration generator, a command value is transmitted to the vibration generator configured to vibrate the handle, the pedals, and the seat on the basis of the longitudinal acceleration generated in the vehicle.

Figure 7:
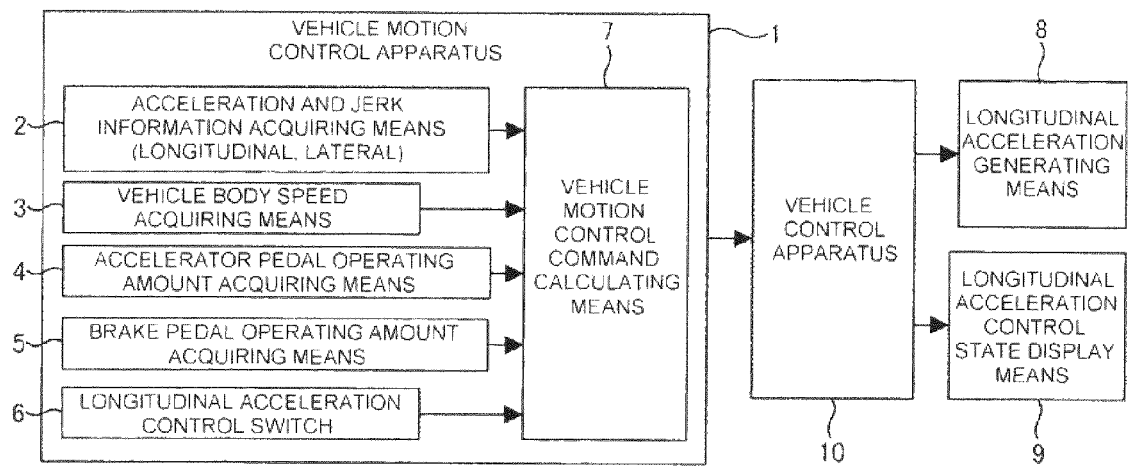
FIG. 7 is a system block diagram illustrating another embodiment in FIG. 6.

Here, a configuration in which the signal for performing drive control of the longitudinal acceleration generating means 8 and the longitudinal acceleration control state display means 9 is not transmitted directly from the vehicle motion control apparatus 1, but the longitudinal acceleration command value is transmitted to another vehicle control apparatus 10 as illustrated in FIG. 7 and a signal for performing drive control of the longitudinal acceleration generating means 8 and the longitudinal acceleration control state display means 9 is transmitted from the vehicle control apparatus 10 is also applicable.

Figure 8:
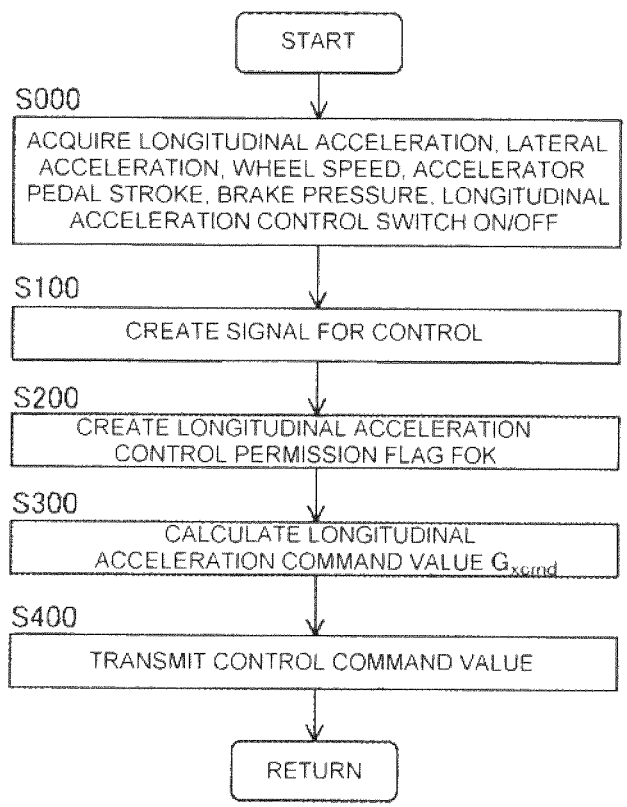
FIG. 8 is a drawing illustrating a calculation flowchart of a vehicle motion control command calculating unit in FIG. 6.

FIG. 8 illustrates a calculation flowchart A1 in the vehicle motion control command calculating means 7 of the vehicle motion control apparatus 1. In the calculation flowchart A1, signals obtained by the acceleration and jerk information acquiring means 2 are assumed to be longitudinal acceleration and lateral acceleration, a signal obtained by the vehicle speed acquiring means 3 is assumed to be wheel speeds of the respective wheels, a signal obtained by the accelerator pedal operating amount acquiring means 4 is assumed to be an accelerator pedal stroke, a signal obtained by the brake pedal operating amount acquiring means 5 is assumed to be a brake pressure, and a signal obtained by the longitudinal acceleration control switch 6 is assumed to be an ON/OFF signal of the switch.

In S000, a longitudinal acceleration $G_x$ and a lateral acceleration $G_y$ obtained by the acceleration and jerk information acquiring means 2, a wheel speed $V_w[x]$ of each of the respective wheels obtained by the vehicle speed acquiring means 3 (x is replaced by each of wheel numbers, left front wheel: 0, right front wheel: 1, left rear wheel: 2, and right rear wheel: 3), an accelerator pedal stroke APS obtained by the accelerator pedal operating amount acquiring means 4, a brake pressure $P_m$ obtained by the brake pedal operating amount acquiring means 5, and switch ON/OFF signals GSW obtained by the longitudinal acceleration control switch 6 are acquired and calculated. After the calculation, the procedure goes to S100.

In S100, a longitudinal jerk $J_x$, a lateral jerk $J_y$, a vehicle speed V, an accelerator pedal operating amount AP, and a brake pedal operating amount BP are calculated as control signals required for control from among the signals acquired in S000. Here, the longitudinal jerk $J_x$ and the lateral jerk $J_y$ are obtained by differentiating the longitudinal acceleration $G_x$ and the lateral acceleration $G_y$. Also, an average value of the wheel speed $V_w[x]$ of the four wheels, or a value obtained by select-high, or a value obtained by combining both values is used as the vehicle speed V. As a method of combining, a higher average value between an average value of the front left and right wheels and an average value of the rear left and right wheels is defined as the vehicle speed V. The accelerator pedal operating amount AP is a value obtained by applying a dead zone process considering a play of the pedal, a filtering process, and the like to the obtained accelerator pedal stroke APS. The brake pedal operating amount BP is a value obtained by adding the filtering process and the like to the brake pressure $P_m$. After the calculation, the procedure goes to S200.

In S200, a longitudinal acceleration control permission flag FOK is created. The longitudinal acceleration control permission flag FOK is set to 1 if (when the vehicle speed V is not lower than a threshold value or during the longitudinal acceleration control by a longitudinal acceleration command value $G_{xcmd}$) and (the switch ON/OFF signal GSW is ON), and is set to 0 under other conditions. When the shift position is input as described above, the longitudinal acceleration control permission flag FOK is set to 1 if (when the vehicle speed V is not lower than the threshold value or during the longitudinal acceleration control by the longitudinal acceleration command value $G_{xcmd}$), (the switch ON/OFF signal GSW is ON), and (the shift position is in the D-range), and is set to 0 under other conditions. After the calculation, the procedure goes to S300.

Figure 9:
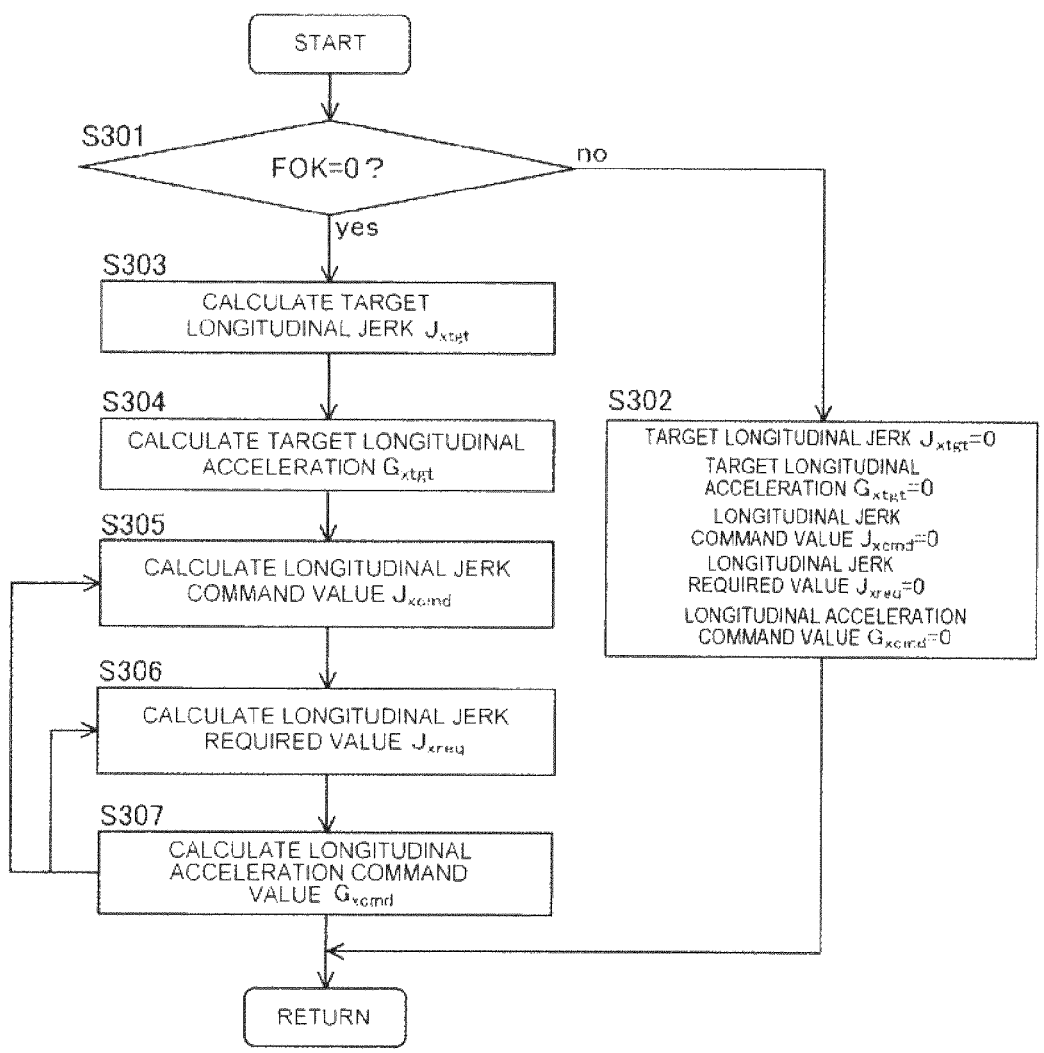
FIG. 9 is a drawing illustrating a calculation flowchart of the vehicle motion control command calculating unit in FIG. 6.

In S300, calculation of the longitudinal acceleration command value $G_{xcmd}$ is performed. FIG. 9 illustrates a calculation flowchart A2 of the longitudinal acceleration command value $G_{xcmd}$.

In S301, the longitudinal acceleration control permission flag FOK is determined. If the longitudinal acceleration control permission flag FOK is 0, the procedure goes to S302, and if it is not 0, the procedure goes to S303.

In S302, a target longitudinal jerk $J_{xtgt}$, a target longitudinal acceleration $G_{xtgt}$, a longitudinal jerk command value $J_{xcmd}$, a longitudinal jerk required value $J_{xreq}$, and the longitudinal acceleration command value $G_{xcmd}$ are set to 0 and the procedure goes to S400 in FIG. 8.

Figure 10:
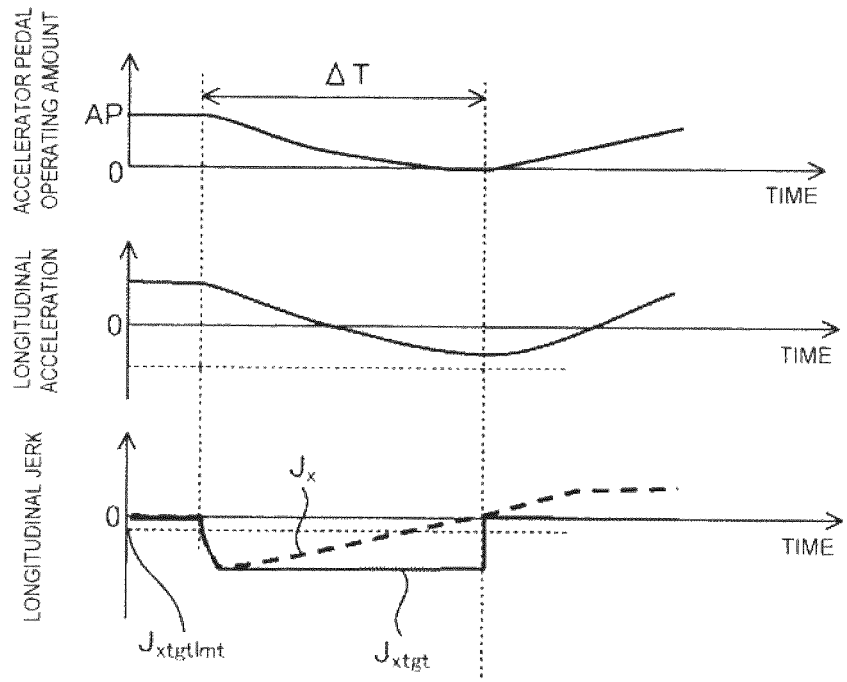
FIG. 10 is a drawing illustrating a relationship between an accelerator pedal operating amount by the driver and a target longitudinal jerk in the vehicle motion control apparatus FIG. 6.

In S303, the target longitudinal jerk $J_{xtgt}$ is calculated on the basis of the longitudinal jerk $J_x$ and the accelerator pedal operating amount AP. As a method of calculating the target longitudinal jerk $J_{xtgt}$ as illustrated in FIG. 10, a minimum value of the longitudinal jerk $J_x$ generated in a period $\Delta T$ from a moment when the accelerator pedal operating amount AP starts to be reduced to a moment reaching 0 is defined as $J_{xtgtimt}$, and the target longitudinal jerk $J_{xtgt}$ is set to 0 when the accelerator pedal operating amount AP starts to be increased. Here, the target longitudinal jerk $J_{xtgt}$ may be an average value in the period $\Delta T$ instead of being the minimum value in the same period.

Also, it is also possible to define values filtered by time constants different between a direction in which the value of the longitudinal jerk $J_x$ is reduced and a direction in which the same is increased as $J_{xtgt}$, and the time constant in the increasing direction may be set to be a very large value in comparison with the time constant in the reducing direction. When the longitudinal jerk to be generated is estimated on the basis of the temporal change of the accelerator pedal operating amount AP, and an estimated value is defined as $J_{xAP}$, the target longitudinal jerk $J_{xtgt}$ may be creased by using one of $J_{xAP}$ and $J_x$ having a larger absolute value.

When a vertical gradient of a road surface is estimated from a differential between the longitudinal acceleration $G_x$ and a longitudinal acceleration $G_{xv}$ obtained by differentiating the vehicle speed V, and it is determined to be on a rising slope or on a downhill slope not lower than a certain threshold value, $J_{xtgt}$ may be created on the basis of $J_{xAP}$. After the calculation, the procedure goes to S304.

Figure 11:
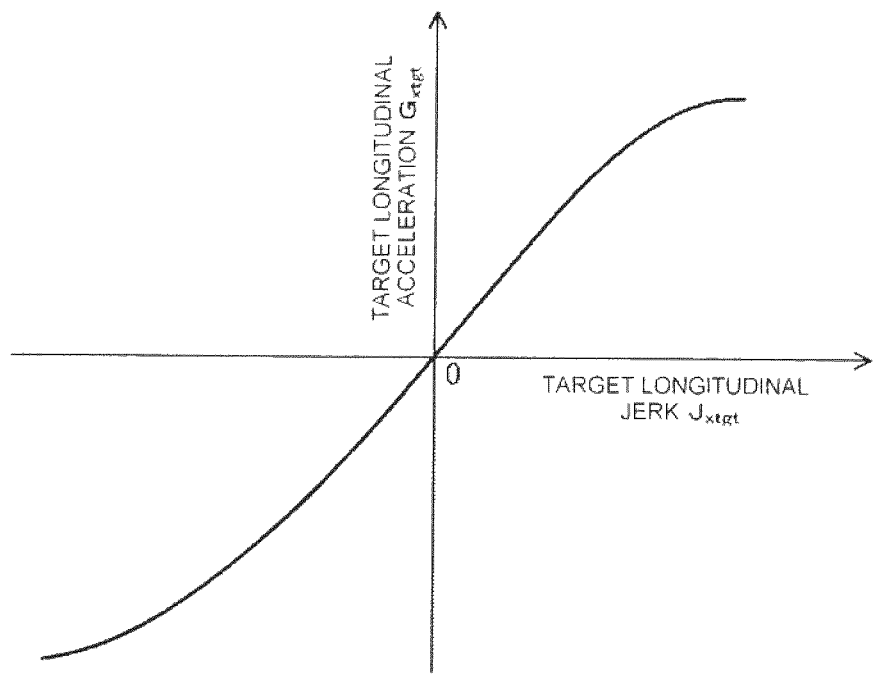
FIG. 11 is a drawing illustrating a relationship between the target longitudinal jerk of the driver and a target longitudinal acceleration in the vehicle motion control apparatus FIG. 6.

In S304, the target longitudinal acceleration $G_{xtgt}$ is calculated on the basis of the target longitudinal jerk $J_{xtgt}$. As a method of calculating the target longitudinal acceleration $G_{xtgt}$, the target longitudinal jerk $J_{xtgt}$ and the target longitudinal acceleration $G_{xtgt}$ have the same sign and set so that the absolute value of the target longitudinal acceleration $G_{xtgt}$ increases with an increase of the target longitudinal jerk $J_{xtgt}$ as illustrated in FIG. 11. After the calculation, the procedure goes to S305.

In S305, the longitudinal jerk command value $J_{xcmd}$ is calculated on the basis of the target longitudinal jerk $J_{xtgt}$, the target longitudinal acceleration $G_{xtgt}$, the accelerator pedal operating amount AP, and a previous value $G_{xcmd\_z1}$ of the longitudinal acceleration command value. The longitudinal jerk command value $J_{xcmd}$ is given by the following expression (1). After the calculation, the procedure goes to S306.

[Expression 1]

$$J_{xcmd} = J_{xtgt} (AP=0 \text{ and } |G_{xcmd\_z1}| \leq |G_{xtgt}|)$$

$$J_{xcmd} = 0 \text{ (conditions other than that described above)} \quad (1)$$

In S306, the longitudinal jerk required value $J_{xreq}$ is calculated on the basis of the lateral acceleration $G_y$, the lateral jerk $J_y$, the accelerator pedal operating amount AP, the brake pedal operating amount BP, and the previous value $G_{xcmd\_z1}$ of the longitudinal acceleration command value $G_{xcmd}$. The longitudinal jerk required value $J_{xreq}$ is given by adding a longitudinal jerk required value (accelerator) $J_{xreqAP}$, a longitudinal jerk required value (brake) $J_{xreqBP}$, and a longitudinal jerk required value (lateral jerk) $J_{xreqJy}$ as illustrated in FIG. 2 to FIG. 4 described above by the following expression (2). After the calculation, the procedure goes to S307.

[Expression 2]

$$J_{xreq} = J_{xreqAP} + J_{xreqBP} + J_{xreqJy} \quad (2)$$

In S307, the longitudinal acceleration command value $G_{xcmd}$ is calculated on the basis of the vehicle speed V, the longitudinal jerk command value $J_{xcmd}$, the longitudinal jerk required value $J_{xreq}$, and the previous value $G_{xcmd\_z1}$ of the longitudinal acceleration command value $G_{xcmd}$. The longitudinal acceleration command value $G_{xcmd}$ is calculated by performing an upper and lower limit value processing which provides a value obtained by integrating a value obtained by adding the longitudinal jerk command value $J_{xcmd}$ and the longitudinal jerk required value $J_{xreq}$ with an upper limit value of 0 and a lower limit value of a longitudinal acceleration command lower limit value $G_{xcmdlmtL}$ illustrated in FIG. 5 described above.

Here, the longitudinal acceleration command lower limit value 1 which is independent from the vehicle speed V may be a preset value, a value set on the basis of an acceleration absolute value $|G_{max}|$ which may be generated on the road surface, or a value set on the basis of an acceleration absolute value $|G_{strlmt}|$ considering also a turning responsiveness at the time of steering. The $|G_{max}|$ and $|G_{strlmt}|$ which may be generated here may be estimated from the relationship between the wheel speed changes of the respective wheels and the longitudinal acceleration $G_x$.

Figure 12:
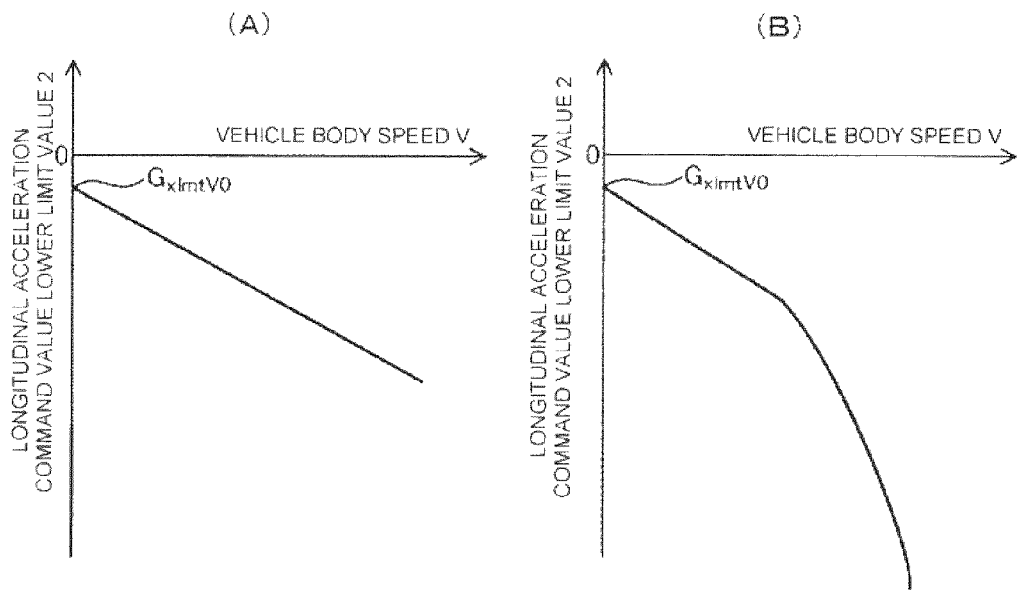
FIG. 12 is a drawing illustrating a relationship between a vehicle speed of the driver and a lower limit value 2 of a longitudinal acceleration command value in the vehicle motion control apparatus FIG. 6.

The longitudinal acceleration command lower limit value 2 depending on the vehicle speed V is set so as to be a maximum value $G_{xlmtV0}$ when the vehicle speed V is 0, and reduced in value with an increase of the vehicle speed V as illustrated in FIG. 12. Here, as a method of reducing the value with the increase of the vehicle speed V, setting so as to be reduced linearly as illustrated in FIG. 12(A) or setting so as to be reduced along a curve projecting upward as illustrated in FIG. 12(B) is applicable.

$G_{xlmtV0}$ is set to a value which allows transmission of command values which can generate a braking force which can maintain a stopped state in the respective wheels to the longitudinal acceleration generating means 8. After the calculation, the procedure goes to S400 in FIG. 8

In S400, a command value which realizes the longitudinal acceleration command value $G_{xcmd}$ if the longitudinal acceleration control permission flag FOK is 1 or a command value which does not perform the longitudinal acceleration control if the longitudinal acceleration control permission flag FOK is 0 is transmitted to the longitudinal acceleration generating means 8 and the longitudinal acceleration control state display means 9.

Here, the signal to be transmitted to the longitudinal acceleration generating means 8 when the longitudinal acceleration control permission flag FOK is 1 is transmitted with the longitudinal acceleration command value $G_{xcmd}$ as a control command value when the longitudinal acceleration command value $G_{xcmd}$ can be realized by the longitudinal acceleration generating means 8 by transmitting the longitudinal acceleration command value $G_{xcmd}$ as described above.

If a command value in accordance with the longitudinal acceleration generating means 8 is needed, a command value controlling the longitudinal acceleration generating means 8 is created on the basis of the longitudinal acceleration command value $G_{xcmd}$ and is transmitted. For example, when the longitudinal acceleration generating means 8 is the hydraulic friction brake and performs the longitudinal acceleration control by transmitting the hydraulic pressure command value to the hydraulic friction brake controller, the hydraulic command value is created on the basis of the longitudinal acceleration command value $G_{xcmd}$ and the created hydraulic command value is transmitted as the control command value. Accordingly, the longitudinal acceleration on the basis of the longitudinal acceleration command value $G_{xcmd}$ is generated in the vehicle.

Also, as described above, a command for realizing the longitudinal acceleration command value $G_{xcmd}$ may be transmitted to a plurality of the longitudinal acceleration generating means 8. For example, when the motor and the hydraulic friction brake described above constitute the longitudinal acceleration generating means 8, a configuration in which the constant longitudinal acceleration command value $G_{xcmd}$ is transmitted to the motor, increment or decrement of the longitudinal acceleration command value $G_{xcmd}$ on the basis of the lateral jerk is transmitted to the hydraulic friction brake, so that the longitudinal acceleration generated finally in the vehicle becomes the longitudinal acceleration command value $G_{xcmd}$ is also applicable.

As a command value to the longitudinal acceleration control state display means 9, for example, if the longitudinal acceleration control permission flag FOK is 1, a drive command value is transmitted to the display device to notify the driver of the fact that the longitudinal acceleration control is performed by the accelerator pedal operation, and when the longitudinal acceleration control by the longitudinal acceleration command value $G_{xcmd}$ is in execution, a drive command value to notify the driver of the fact that the control is in execution is transmitted to the display device or the sound generator. The drive command value may be transmitted so that the output of the display device or the sound generator changes in accordance with the size of the longitudinal acceleration command value $G_{xcmd}$.

As illustrated in FIG. 7 described above, when a configuration is such that a signal is transmitted to the vehicle control apparatus 10, the longitudinal acceleration command value $G_{xcmd}$ is transmitted to as a command value to the vehicle control apparatus 10, and a command value to perform drive control of the longitudinal acceleration generating means 8 and the longitudinal acceleration control state display means 9 by the vehicle control apparatus 10 is transmitted.

As described above, in the present invention, by controlling the longitudinal acceleration on the basis of the longitudinal jerk generated by the operation of the accelerator pedal by the driver, a range of the longitudinal acceleration which can be generated by the driver by the accelerator pedal may be effectively widened, so that the step changing operation of the pedal may be reduced.

Also, in this embodiment, there has been a description as an input signal to the vehicle motion control apparatus 1 that the signals acquired by the acceleration and jerk information acquiring means 2 are assumed to be a longitudinal acceleration and a lateral acceleration, the signal acquired by the vehicle speed acquiring means 3 is assumed to be wheel speeds of the respective wheels, the signal acquired by the accelerator pedal operating amount acquiring means 4 is assumed to be the accelerator pedal stroke, the signal acquired by the brake pedal operating amount acquiring means 5 is assumed to be a brake pressure, and the signal obtained by the longitudinal acceleration control switch 6 is assumed to be an ON/OFF signal of the switch. However, the invention is not necessarily limited to a case in which all of these signal are input.

For example, as the input signal to the vehicle motion control apparatus 1, the signal obtained by the acceleration and jerk information acquiring means 2 is limited to the lateral acceleration, and the target longitudinal jerk $J_{xtgt}$ may be calculated from $J_{xAP}$, which is a temporary change of the accelerator pedal operating amount AP.

(Second Embodiment for Carrying Out the Invention)

Hereinafter, with reference to FIG. 13 to FIG. 15, a configuration and an action of a vehicle motion control apparatus 1' according to a second embodiment of the present invention will be described.

Figure 13:
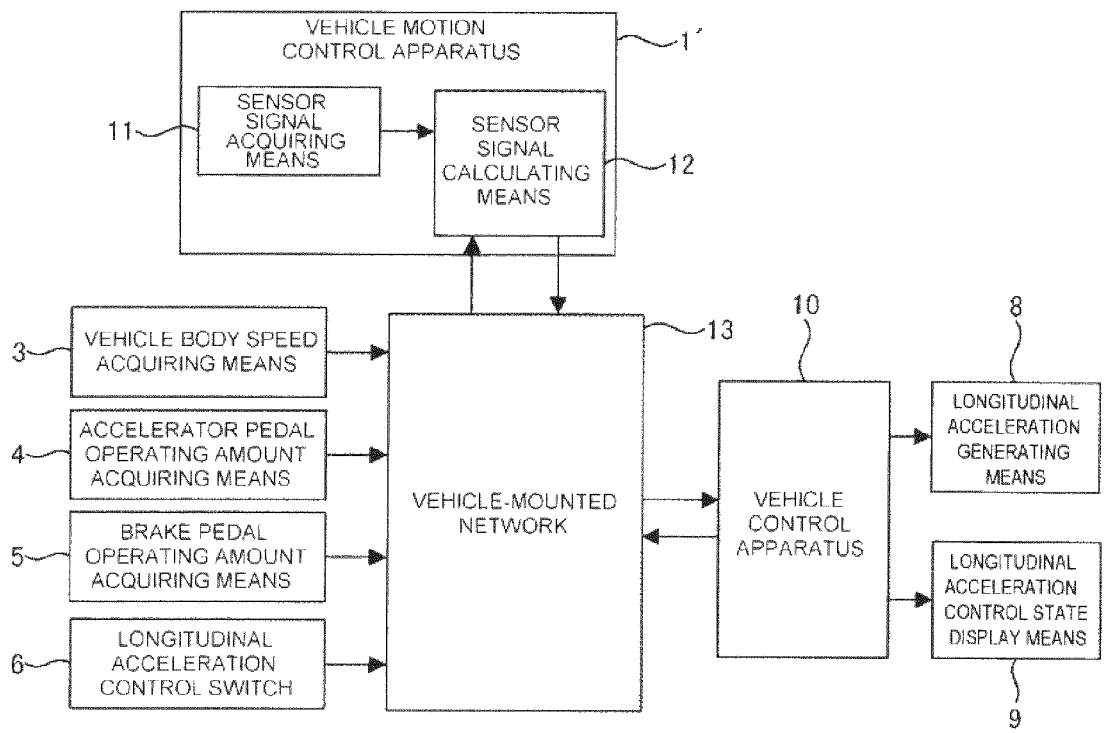
FIG. 13 is a system block diagram illustrating a second embodiment of a vehicle motion control apparatus according to the present invention.
Figure 14:
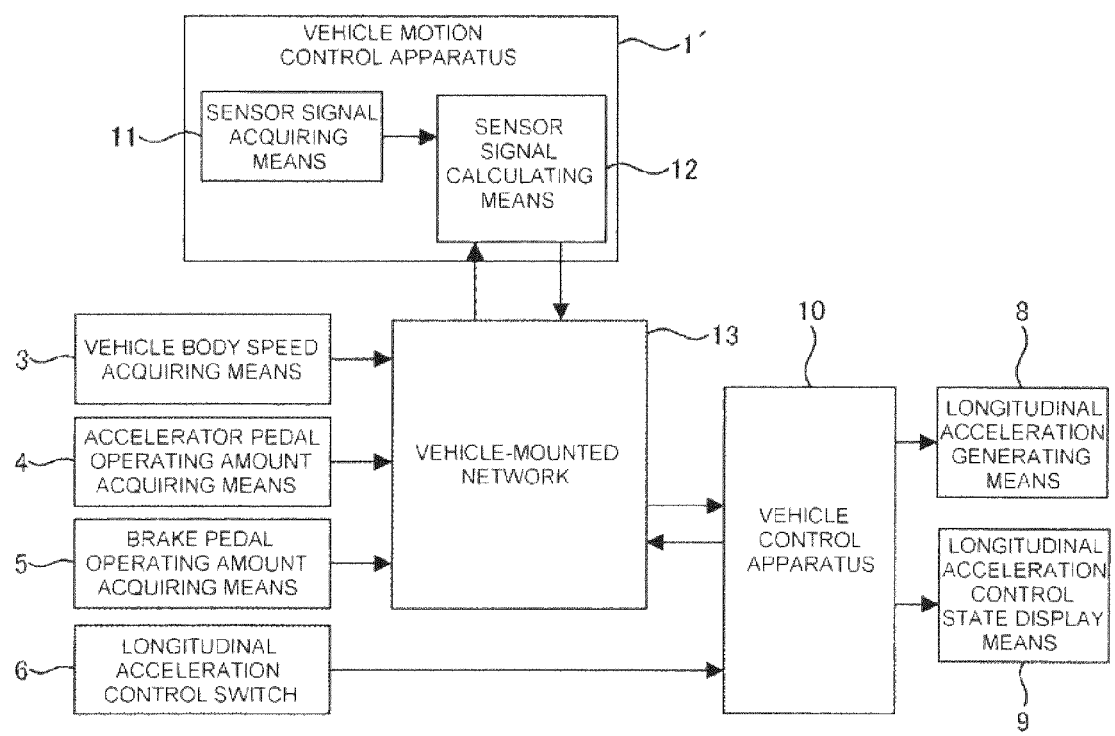
FIG. 14 is a system block diagram illustrating another embodiment in FIG. 13.

FIG. 13 is a block diagram of a vehicle motion control system having the vehicle motion control apparatus 1' according to the second embodiment of the present invention.

The vehicle motion control apparatus 1' of this embodiment is configured to be mounted on a vehicle, includes a sensor signal acquiring means 11 and a sensor signal calculating means 12, and performs input and output of signals to and from a vehicle-mounted network 13. Also, the vehicle speed acquiring means 3, the accelerator pedal operating amount acquiring means 4, the brake pedal operating amount acquiring means 5, the longitudinal acceleration control switch 6, the longitudinal acceleration generating means 8, the longitudinal acceleration control state display means 9, and the vehicle control apparatus 10 are the same as those in the first embodiment described above. Here, the longitudinal acceleration control switch 6 does not necessarily have to be connected to the vehicle-mounted network 13 and may be connected to the vehicle control apparatus 10 as illustrated in FIG. 14.

The sensor signal acquiring means 11 is a sensor configured to acquire information available for vehicle control, and the sensor signal acquiring means 11 may be any one of an acceleration sensor, a rotational speed sensor, a sensor capable of acquiring both of the acceleration and the rotational speed, or a vehicle speed sensor, as long as information required for any vehicle control can be acquired.

The sensor signal calculating means 12 is a calculating apparatus having a storage area, a calculation processing performance, and signal input and output means, and is configured to process signal obtained by the sensor signal acquiring means 11, calculate the longitudinal acceleration command value to be generated by the vehicle, and send a signal processing value obtained by the sensor signal acquiring means 11 and the longitudinal acceleration command value to the vehicle-mounted network 13. For example, when the sensor signal acquiring means 11 is the acceleration sensor which can detect the longitudinal acceleration and the lateral acceleration generated in the vehicle, the sensor signal calculating means 12 calculates the longitudinal acceleration and the lateral acceleration from the signal obtained by the acceleration sensor. In addition, information such as the accelerator pedal stroke, the brake pressure, the wheel speed, and the shift position, is acquired via a communication with the vehicle-mounted network, the longitudinal acceleration command value is calculated from the longitudinal acceleration and the lateral acceleration, and the longitudinal acceleration, the lateral acceleration, and the longitudinal acceleration command value are transmitted to the vehicle-mounted network.

Figure 15:
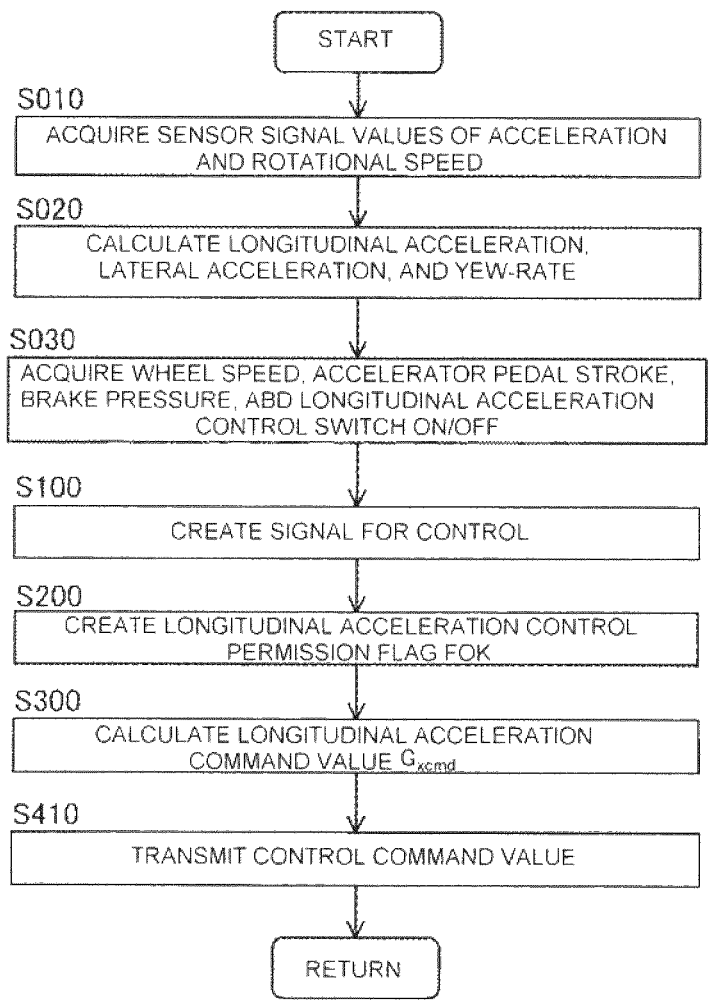
FIG. 15 is a drawing illustrating a calculation flowchart of a vehicle motion control command calculating unit in FIG. 13.

FIG. 15 shows a calculation flowchart B1 in the sensor signal calculating means 12 of the vehicle motion control apparatus 1'. In the calculation flowchart B1, the sensor signal acquiring means 11 is assumed to be a sensor capable of acquiring both the acceleration and the rotational speed, and this sensor is assumed to be mounted so as to acquire the longitudinal acceleration, the lateral acceleration, and the yaw rate, which is the rotational speed in the direction of turn of the vehicle generated at a center of gravity of the vehicle. The signals acquired via the vehicle-mounted network 13 are assumed to be wheel speed, accelerator pedal stroke, brake pressure, and longitudinal acceleration control switch ON/OFF signals.

In S010, sensor signal values required for calculating the longitudinal acceleration $G_x$, the lateral acceleration Gy, and a yaw rate r are acquired by the sensor signal acquiring means 11. Here, the acceleration detecting means may be a method of detecting a positional change of a substance in the interior of the sensor by acceleration or may be a method of detecting the movement of heated gas. The rotational speed detecting means may be a method of using a Coriolis force or may be a method of using Sagnac effect. After the acquisition of signal, the procedure goes to S020.

In S020, the longitudinal acceleration Gx, the lateral acceleration $G_y$, and the yaw rate r are calculated from signals obtained by the sensor signal acquiring means 11. After the calculation, the procedure goes to S030.

In S030, wheel speed, accelerator pedal stroke, brake pressure, and longitudinal acceleration control switch ON/OFF signals are acquired via the vehicle-mounted network 13. After the calculation, the procedure goes to S100.

Calculations from S100 to S300 are the same as those in the first embodiment described above.

In S410, if the longitudinal acceleration Gx, the lateral acceleration $G_y$, the yaw rate r, and the longitudinal acceleration control permission flag FOK are 1, the command value which realizes the longitudinal acceleration command value $G_{xcmd}$ is transmitted to the vehicle-mounted network 13. Here, the signal to be transmitted to the vehicle-mounted network 13 when the longitudinal acceleration control permission flag FOK is 1 is transmitted with the longitudinal acceleration command value $G_{xcmd}$ as a control command value when the longitudinal acceleration command value $G_{xcmd}$ can be realized by the vehicle control apparatus 10 by transmitting the longitudinal acceleration command value $G_{xcmd}$ as described above. Also, if the command value in accordance with the longitudinal acceleration generating means 8 is needed to be transmitted to the vehicle control apparatus 10, the command value controlling the longitudinal acceleration generating means 8 is created on the basis of the longitudinal acceleration command value $G_{xcmd}$ and is transmitted.

In this manner, by integrating the present invention into the signal processing unit of the sensor needed to be mounted on the vehicle, the present invention may be realized without increasing the number of components to be mounted on the vehicle. Furthermore, by integrating the signal required for realizing the present invention into a sensor as described above, delay or lowering of accuracy at the time of acquiring the signal required for implementing the present invention may be suppressed. Accordingly, even when creating signals such as the longitudinal jerk or the lateral jerk, for example, from the longitudinal acceleration and the lateral acceleration, signals with high accuracy and little delay may be created.

(Method of Controlling Longitudinal Acceleration on the Basis of Brake Pedal Operation)

In the present invention, control of the longitudinal acceleration is performed on the basis of the longitudinal jerk generated by the pedal operation by the driver. Prior to describing the embodiments, a method of controlling a positive longitudinal acceleration on the basis of the longitudinal jerk generated by the brake pedal operation by the driver will be described below with reference to FIG. 16 to FIG. 20 so as to facilitate understanding of the present invention.

Figure 16:
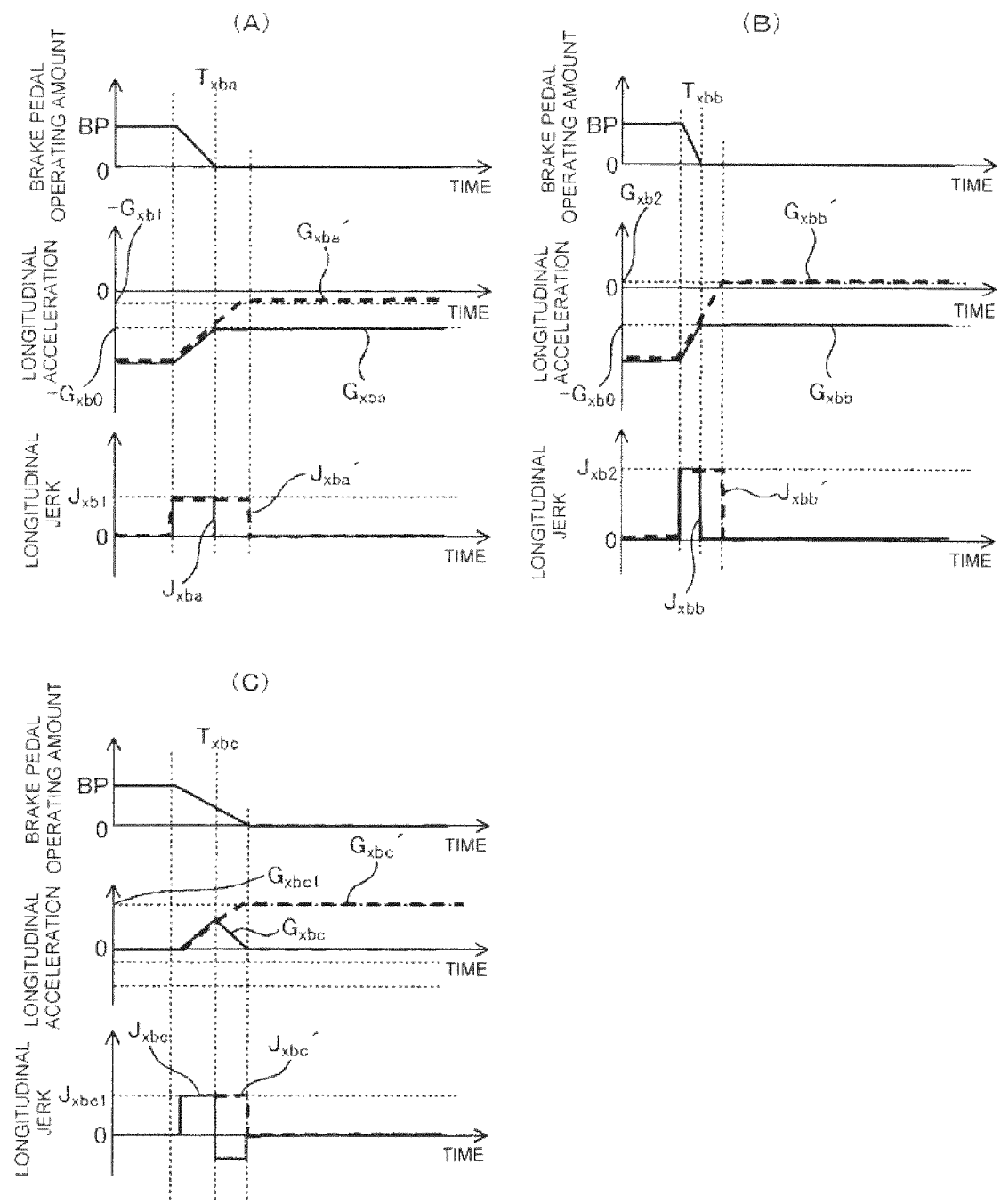
FIG. 16 is a drawing illustrating a concept at the time of acceleration control by a longitudinal acceleration command value of the present invention.

FIG. 16 illustrates a conceptual drawing at the time of acceleration control by the longitudinal acceleration command value $G_{xcmd}$ of the present invention. It shows a longitudinal acceleration and a longitudinal jerk generated when the brake pedal is started to open from the brake pedal position, which requires a certain brake pedal operating amount BP, and the brake pedal operating amount is 0 during the travel at a certain positive vehicle speed V0 in FIGS. 16(A) and (B), and during the stop in FIG. 16(C).

A brake pedal operating speed is different in FIGS. 16(A) and (B), and a condition is that the brake pedal operating speed in FIG. 16(B) is higher than that in FIG. 16(A). Reference sign $G_{xba}$ in FIG. 16(A) and reference sign $G_{xbb}$ in FIG. 16(B) denote respectively longitudinal accelerations generated when no control is performed, and reference sign $J_{xba}$ in FIG. 16(A) and $J_{xbb}$ in FIG. 16(B) denote longitudinal jerks at this time. As illustrated in FIGS. 16(A) and (B), values of the positive longitudinal jerks generated when the acceleration pedal is opened are different because the acceleration pedal operating speeds are different such as $J_{xb1}$ at $J_{xba}$ and $J_{xb2}$ at $J_{xbb}$, but the finally generated longitudinal accelerations $G_{xba}$ and $G_{xbb}$ become a comparable value, $-G_{xb0}$.

In the present invention, a difference between the longitudinal jerk $J_{xba}$ and $J_{xbb}$ is focused, and the longitudinal accelerations different depending on the difference between $J_{xba}$ and $J_{xbb}$ are added, and the finally generated longitudinal acceleration is changed.

Specifically, as illustrated in FIGS. 16(A) and (B), longitudinal acceleration $G_{xba}'$ and $G_{xbb}'$ with which longitudinal jerks $J_{xba}'$ and $J_{xbb}'$ generated by control at a time $T_{xba}$ and $T_{xbb}$ when the opening operation of the brake pedal is terminated become values comparable to the longitudinal jerks $J_{xb1}$ and $J_{xb2}$ generated by the brake pedal operation by the driver is generated.

Also, the longitudinal acceleration is added so that $G_{xba}'$ finally becomes $-G_{xb1}$, and $G_{xbb}'$ becomes $G_{xb2}$, where the final magnitudes of $G_{xba}'$ and $G_{xbb}'$ are different depending on the magnitude of $J_{xb1}$ and $J_{xb2}$, and the absolute value of the finally generated longitudinal acceleration increases with an increase of the absolute values of the $J_{xb1}$ and $J_{xb2}$. In an automatic transmission-mounted vehicle, if the gear position is in the drive range, a drive torque acts on a drive wheel and, with the opening of the brake pedal, the vehicle is accelerated to a certain vehicle speed even though the accelerator pedal is not pressed (so-called a creep phenomenon). In recent years, there is a vehicle controlled so that a certain drive torque may be added by opening of the brake pedal even not being the automatic transmission-mounted vehicle.

In these vehicles, as illustrated by $G_{xbc}$ in FIG. 16(C), the positive longitudinal acceleration is generated by the opening of the brake pedal and, subsequently, the longitudinal acceleration is reduced, and becomes constant at a certain vehicle speed. Although the longitudinal jerk generated at this time has a shape reversed from positive to negative at $T_{xbc}$ as illustrated by $J_{xbc}$, in the present invention, a positive longitudinal jerk $J_{xbc}1$ generated at this time is focused, and a longitudinal acceleration $G_{xbc}1$ which becomes finally $G_{xbc}1$ at the longitudinal jerk of $J_{xbc}1$ is generated as illustrated by $J_{xbc}$.

Accordingly, the area of the longitudinal acceleration which can be generated by the brake pedal operation may be increased, and the driver is capable of controlling the magnitude of the finally generated longitudinal acceleration by controlling the longitudinal jerk generated when the brake pedal is opened.

Also, by generating the longitudinal jerk which becomes the value comparable to the longitudinal jerk generated by the driver, a longitudinal acceleration control without a feeling of discontinuity is achieved, so that the feeling of the driver may be improved. Also, in a case where a drive-off control by opening the brake pedal is added to the vehicle which does not cause the creep phenomenon like a non-automatic transmission-mounted vehicle or an electric vehicle, the longitudinal acceleration generated in accordance with the brake pedal operation may be changed by estimating the longitudinal jerk that the driver expects from the brake pedal operating speed.

In the present invention, the longitudinal acceleration generated on the basis of the brake pedal operation by the driver ($G_{xba}'$ in FIG. 16(A) or $G_{xbb}'$ in FIG. 16(B), or $G_{xbc}'$ in FIG.

16(C)) changes on the basis of the acceleration pedal operating amount by the driver, the brake pedal operating amount by the driver, the lateral jerk generated by the handle operation of the driver, or the vehicle speed.

Figure 17:
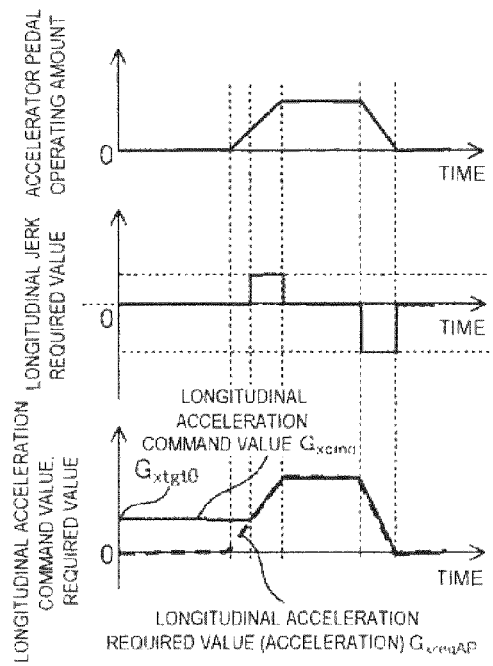
FIG. 17 is a drawing illustrating a concept of a change of a longitudinal acceleration command value when a driver operates an accelerator pedal during acceleration on the basis of the longitudinal acceleration command value of the present invention.

FIG. 17 illustrates a conceptual drawing of the longitudinal acceleration command value $G_{xcmd}$ when the driver operates the accelerator pedal during deceleration in which the value of the longitudinal acceleration command value $G_{xcmd}$ becomes $G_{xtgt0}$. In the present invention, the longitudinal acceleration required value (acceleration) $G_{xreqAp}$ is created from the brake pedal operating amount of the driver, and if the absolute value of the $G_{xreqAp}$ is not less than an absolute value of the longitudinal acceleration command value $G_{xcmd}$, the longitudinal jerk required value (acceleration) $J_{xreqAP}$ is created from the temporal change of $G_{xreqAp}$ to change the longitudinal acceleration command value $G_{xcmd}$ on the basis of the longitudinal jerk required value (acceleration) $J_{xreqAP}$. Accordingly, when an attempt is made to generate acceleration not lower than the acceleration generated by the longitudinal acceleration control by operating the accelerator pedal during the acceleration on the basis of the longitudinal acceleration command value $G_{xcmd}$, acceleration in accordance with the accelerator pedal operation by the driver is enabled.

Figure 18:
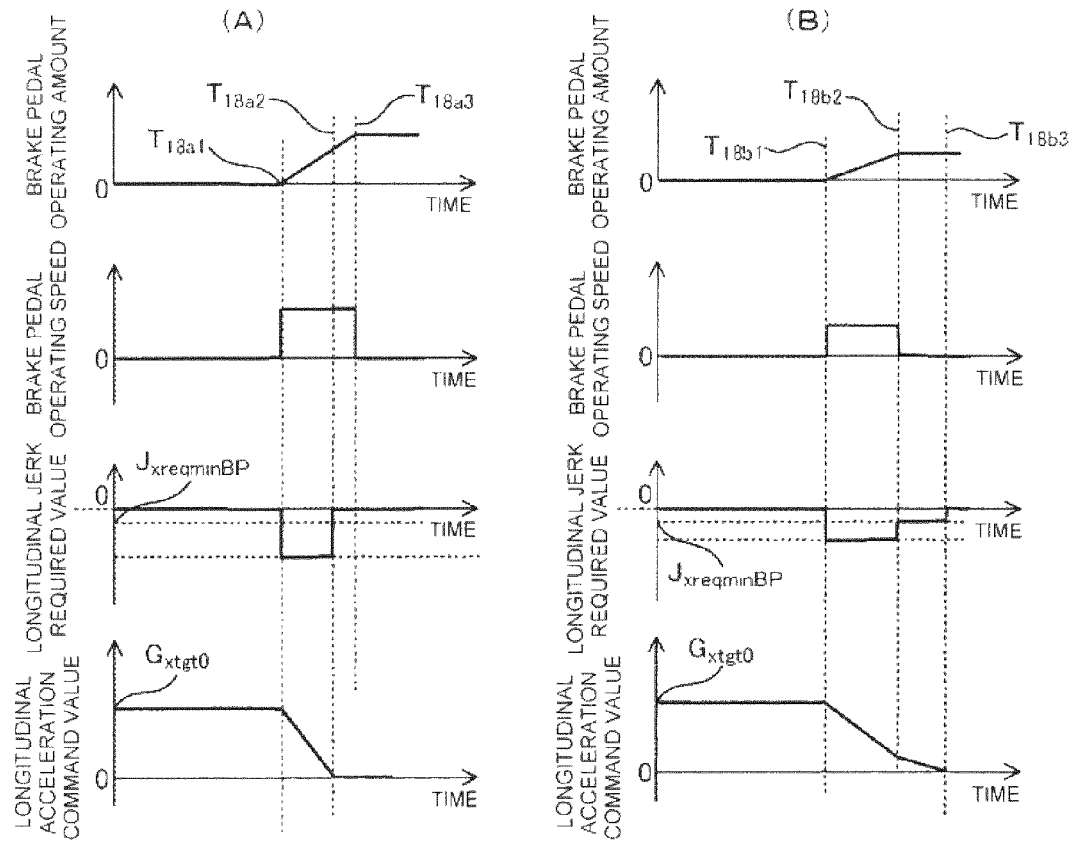
FIG. 18 is a drawing illustrating a concept of a longitudinal acceleration command value when the driver operates a brake pedal during acceleration on the basis of the longitudinal acceleration command value of the present invention.

FIG. 18 illustrates a conceptual drawing of a change of the longitudinal acceleration command value when the driver operates the brake pedal during acceleration in which the value of the longitudinal acceleration command value $G_{xcmd}$ becomes $G_{xtgt0}$.

In the present invention, the longitudinal jerk required value (brake) $J_{xreqBP}$ is created from a temporal change of the brake pedal operating amount by the driver, that is, the brake pedal operating speed, and the longitudinal acceleration command value $G_{xcmd}$ is changed on the basis of the longitudinal jerk required value (brake) $J_{xreqBP}$.

As illustrated in FIGS. 18(A) and (B), when the brake pedal operating amount is changed so as to increase, a longitudinal jerk required value (brake) $J_{xreqAP}$ having a negative value is crated. Here, the longitudinal jerk required value (brake) $J_{xreqBP}$ increases with an increase of the brake pedal operating speed.

Under the condition that the brake pedal operating speed is positive as shown from $T_{18a1}$ to $T_{18a3}$ in FIG. 18(A), when the longitudinal acceleration command value $G_{xcmd}$ becomes 0 as shown at $T_{18a2}$ in FIG. 18(A), the longitudinal jerk required value (brake) $J_{xreqBP}$ is set to 0, and the deceleration control by the longitudinal acceleration command value $G_{xcmd}$ is terminated.

Under the condition that the brake pedal operating speed is positive as shown from $T_{18b1}$ to $T_{18b2}$ in FIG. 18(B), when the brake pedal operating amount is positive and the longitudinal acceleration command value $G_{xcmd}$ is not 0 as shown at $T_{18b2}$ in FIG. 18(B), the longitudinal acceleration command value $G_{xcmd}$ is changed with the longitudinal jerk required value as a minimum value ($J_{xreqminBP}$) of the longitudinal jerk required value (brake) $J_{xreqBP}$, and when the longitudinal acceleration command value becomes 0 as shown at T18b3 in FIG. 18(B), the longitudinal jerk required value (brake) $J_{xreqBP}$ is set to 0. Accordingly, when the driver operates the brake pedal during acceleration by the longitudinal acceleration command value $G_{xcmd}$, even when the operating speed of the brake pedal is small, the longitudinal acceleration command value $G_{xcmd}$ may be set to 0, so that deceleration in accordance with the brake pedal operating amount is enabled.

Figure 19:
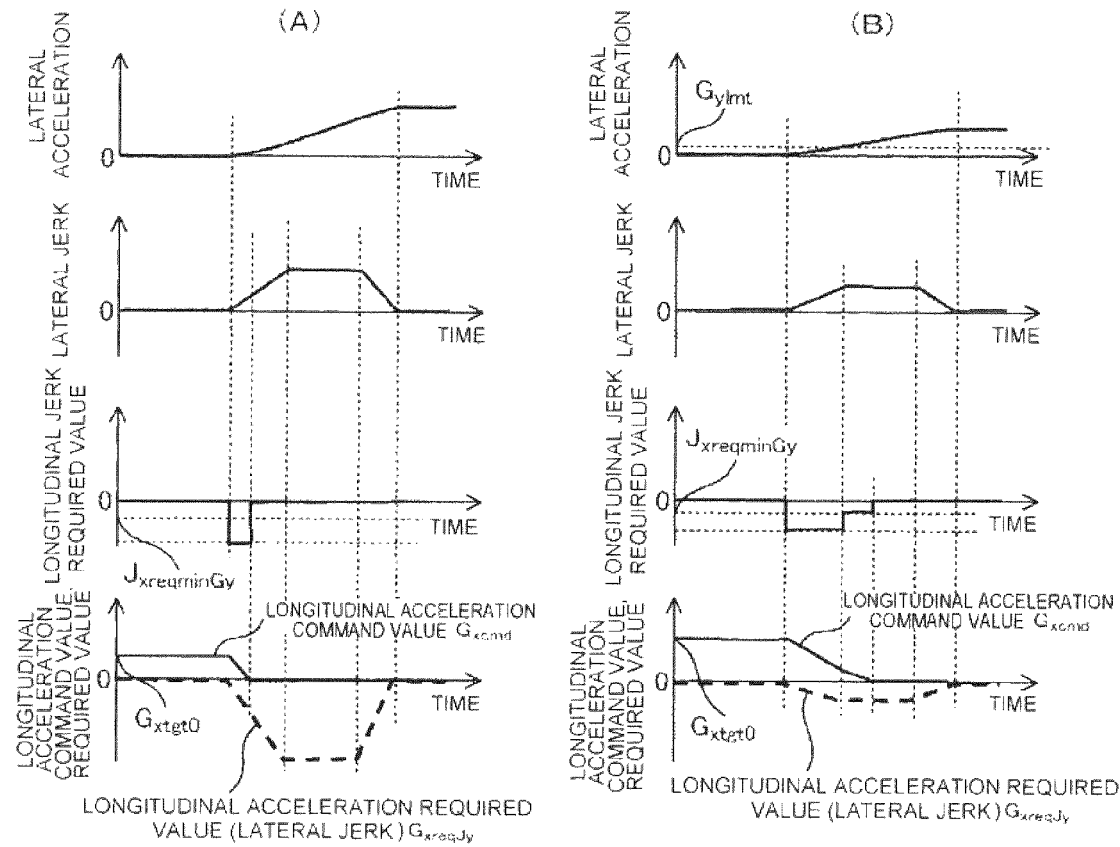
FIG. 19 is a drawing illustrating a concept of a longitudinal acceleration command value when the driver operates a handle and generates a lateral acceleration during acceleration on the basis of the longitudinal acceleration command value of the present invention.

FIG. 19 illustrates a conceptual drawing of the longitudinal acceleration command value $G_{xcmd}$ when the driver operates the handle and lateral acceleration is generated during acceleration in which the value of the longitudinal acceleration command value $G_{xcmd}$ becomes $G_{xtgt0}$. In the present invention, the longitudinal acceleration required value (lateral jerk) $G_{xreqJy}$ is created from the lateral jerk generated by the driver, as illustrated in FIG. 19(A), the longitudinal jerk required value (lateral jerk) $J_{xreqJy}$ is created from the temporal change of $G_{xreqJY}$, and the longitudinal acceleration command value $G_{xcmd}$ is changed on the basis of the longitudinal jerk required value (lateral jerk) $J_{xreqJy}$ and when the longitudinal acceleration command value becomes 0, the longitudinal jerk required value (lateral jerk) $J_{xreqJy}$ is set to 0.

If the absolute value of the $G_{xreqJy}$ is smaller than the absolute value of the generated longitudinal acceleration command value $G_{xcmd}$, and as illustrated in FIG. 19(B), when the longitudinal acceleration required value (lateral jerk) $G_{xreqJy}$ is negative and the longitudinal acceleration command value $G_{xcmd}$ is not 0, the longitudinal acceleration required value $G_{xcmd}$ is changed with $J_{xreqminGy}$ as a maximum value of the longitudinal jerk required value (lateral jerk) $J_{xreqJy}$. Here, a method of creating $G_{xreqJy}$ from the lateral jerk is proposed in International Journal of Automotive Engineering Vol 39, No. 3, 2008.

Accordingly, when the driver operates the handle during the control of the acceleration by the longitudinal acceleration command value $G_{xcmd}$, the longitudinal acceleration command value $G_{xcmd}$ is changed on the basis of the generated lateral jerk, so that acceleration and deceleration in conjunction with the lateral motion are enabled.

Figure 20:
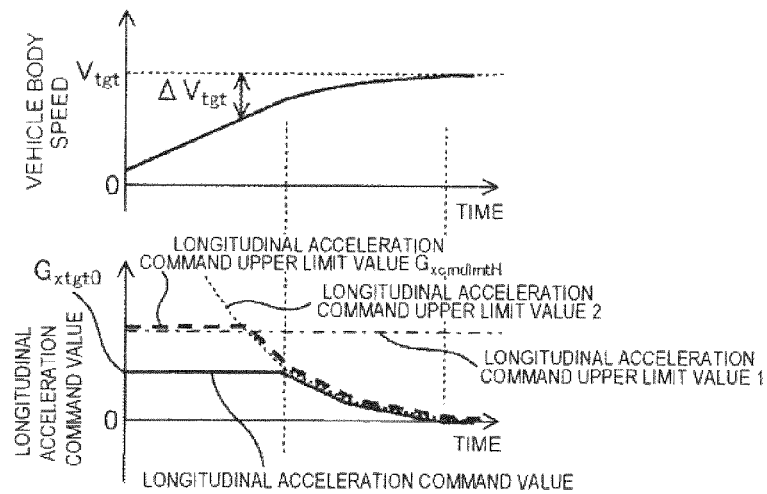
FIG. 20 is a drawing illustrating a concept of a change of a longitudinal acceleration command value when a vehicle speed is increased during acceleration on the basis of the longitudinal acceleration command value of the present invention.

FIG. 20 illustrates a conceptual drawing of a change of the longitudinal acceleration command value when the vehicle speed V is increased by acceleration in which the value of the longitudinal acceleration command value $G_{xcmd}$ becomes $G_{xtgt0}$.

In the present invention, when the longitudinal acceleration command value is a positive value (acceleration), the absolute value of the longitudinal acceleration command value is reduced with a reduction of a value $\Delta V_{tgt}$ obtained by subtracting the vehicle speed V from a target vehicle speed $V_{tgt}$ set on the basis of the longitudinal jerk generated by the pedal opening operation of the driver, more specifically, when the positive longitudinal acceleration is generated in accordance with the brake pedal operation of the driver, a certain target vehicle speed $V_{tgt}$ is set, the absolute value of the longitudinal acceleration command value $G_{xcmd}$ is set to be reduced in accordance with a reduction of the value $\Delta V_{tgt}$, obtained by subtracting the vehicle speed V from the target vehicle speed $V_{tgt}$ and the absolute value of the longitudinal acceleration command value $G_{xcmd}$ is set to become 0 when $\Delta V_{tgt}$ is 0 or lower.

As this method, for example, as illustrated in FIG. 20, the absolute value of the longitudinal acceleration command value $G_{xcmd}$ can be reduced with lowering of $\Delta V_{tgt}$ by setting a longitudinal acceleration command upper limit value $G_{xcmdlmtH}$, which is an upper limit value of the longitudinal acceleration command value $G_{xcmd}$, to include a longitudinal acceleration command upper limit value 2 set so that the absolute value of the longitudinal acceleration command upper limit value is reduced with lowering of the $\Delta V_{tgt}$ in addition to a longitudinal acceleration command upper limit value 1 set independent from $\Delta V_{tgt}$, and setting the value of one of the longitudinal acceleration command upper limit value 1 and the longitudinal acceleration command upper limit value 2 having a smaller absolute value as the longitudinal acceleration command upper limit value $G_{xcmdlmtH}$.

Accordingly, when the vehicle reaches the target vehicle speed $V_{tgt}$ by acceleration control on the basis of the longitudinal acceleration command value $G_{xcmd}$, the occurrence of an abrupt longitudinal acceleration change may be suppressed. Here, the target vehicle speed $V_{tgt}$ may be a preset value or a value changing with the longitudinal acceleration command, and the target vehicle speed $V_{tgt}$ may be set to a value increasing with the increase of the longitudinal acceleration command.

As described thus far, in the present invention, the positive longitudinal acceleration, that is, the acceleration may be generated in the vehicle on the basis of the longitudinal jerk generated by the operation of the brake pedal by the driver or the longitudinal jerk that the driver expects by the driver by the operation of the brake pedal, and furthermore, the generated acceleration is changed in accordance with the accelerator pedal operation, the brake pedal operation, or the handle operation performed by the driver, a constant acceleration to the target vehicle speed is performed unless the driver performs any input operation during the acceleration control (if the vehicle speed is larger than a certain value), and if the driver performs any input operation, acceleration control according to the input is performed.

In this manner, by varying the acceleration in accordance with the longitudinal jerk when the brake pedal is opened, the driver is capable of controlling the acceleration to be generated instinctively, and in addition, the operation to maintain the acceleration constant is performed by control, so that the operating load of the driver may be reduced. Accordingly, for example, in a case of travelling while following after vehicles ahead, in which acceleration and deceleration are repeated in the towns, or following after vehicles ahead during traffic jam, the driver may change the generated acceleration by the control of the longitudinal jerk at the time of opening of the brake pedal, and may reduce the step changing operation between the pedals.

(Third Embodiment for Carrying Out the Invention)

Hereinafter, with reference to FIG. 21 to FIG. 26, a configuration and an action of a vehicle motion control apparatus 1" according to a third embodiment of the present invention will be described.

Figure 21:
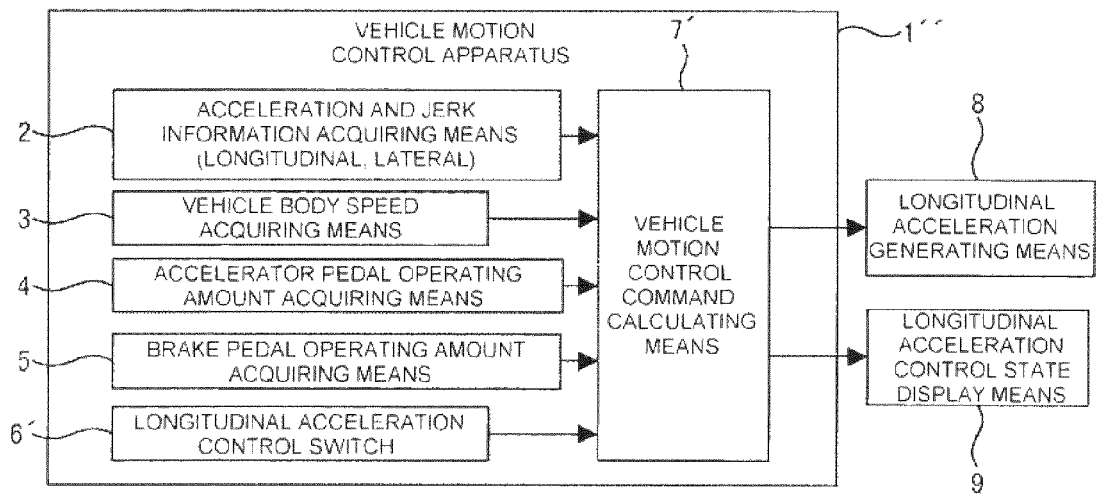
FIG. 21 is a system block diagram illustrating a third embodiment of a vehicle motion control apparatus according to the present invention.

FIG. 21 is a block diagram of a vehicle motion control system having the vehicle motion control apparatus 1" according to the third embodiment of the present invention.

The vehicle motion control apparatus 1" of this embodiment is to be mounted on a vehicle, and includes the acceleration and jerk information acquiring means 2, the vehicle speed acquiring means 3, the accelerator pedal operating amount acquiring means 4, the brake pedal operating amount acquiring means 5, a longitudinal acceleration control switch 6', and a vehicle motion control command calculating means 7', and performs signal output to the longitudinal acceleration generating means 8 and the longitudinal acceleration control state display means 9.

Here, the acceleration and jerk information acquiring means 2, the vehicle speed acquiring means 3, the accelerator pedal operating amount acquiring means 4, the brake pedal operating amount acquiring means 5, the longitudinal acceleration generating means 8, and the longitudinal acceleration control state display means 9 are the same as those in the first embodiment described above.

The longitudinal acceleration control switch 6' is a switch for detecting the ON/OFF of the longitudinal acceleration control of the present invention. Here, the longitudinal acceleration control switch 6' is not a switch to be independently installed, but may be those operated in conjunction with other inputs. For example, when providing a mode change-over switch for changing responsiveness of the engine for inputs of the accelerator pedal, the longitudinal acceleration control may be set to ON in a mode in which the responsiveness of the engine is the highest.

It may be a switch for switching the longitudinal acceleration control between ON and OFF in response to input switching performed by the driver and the shift position. For example, in the case of the vehicle having the automatic transmission, it may be a switch configured to turn the longitudinal acceleration control ON when the shift position is in the D-range and the input switching performed by the driver is ON, and turn the longitudinal acceleration control OFF under other conditions.

Alternatively, when outwards information acquiring means that is capable of detecting obstacles or the like around the own vehicle is provided like cameras and millimeter waves, it may be a switch for turning the longitudinal acceleration control OFF when a substance which may come into contact with the own vehicle exists in the direction of travel thereof on the basis of information obtained by the outwards information acquiring means in addition to the shift position and an input switching performed by the driver.

The process on the basis of the shift position or the process on the basis of the outwards information described above may be performed so as to switch the longitudinal acceleration control between ON and OFF in the vehicle motion control command calculating means 7' by inputting the shift position information and the outwards information to the vehicle motion control command calculating means 7'.

The vehicle motion control command calculating means 7' is a calculating apparatus having a storage area, a calculation processing performance, and signal input and output means, and is configured to calculate the longitudinal acceleration command value to be generated in the vehicle, and send a signal to the longitudinal acceleration generating means 8 and the longitudinal acceleration control state display means 9.

Figure 22:
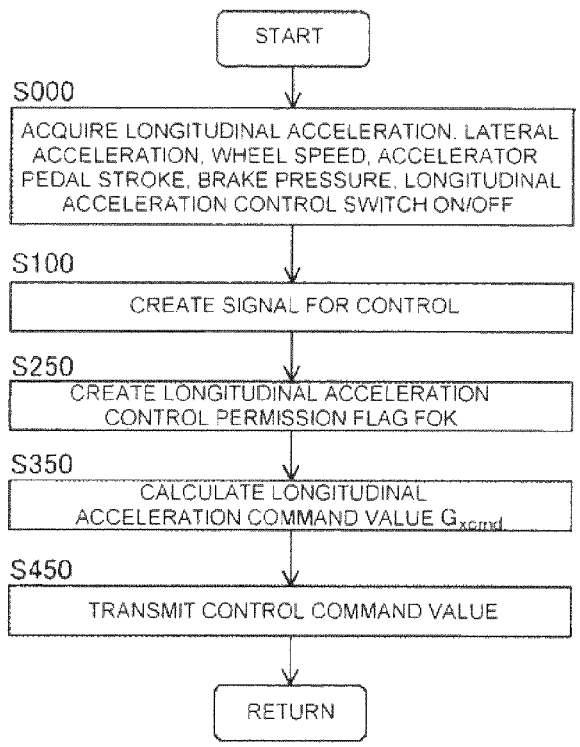
FIG. 22 is a drawing illustrating a calculation flowchart of a vehicle motion control command calculating unit in FIG. 21.

FIG. 22 shows a calculation flowchart C1 in the vehicle motion control command calculating means 7' of the vehicle motion control apparatus 1". In the calculation flowchart C1, signals obtained by the acceleration and jerk information acquiring means 2 are assumed to be a longitudinal acceleration and a lateral acceleration, a signal obtained by the vehicle speed acquiring means 3 is assumed to be wheel speeds of the respective wheels, a signal obtained by the accelerator pedal operating amount acquiring means 4 is assumed to be an accelerator pedal stroke, a signal obtained by the brake pedal operating amount acquiring means 5 is assumed to be a brake pressure, and a signal obtained by the longitudinal acceleration control switch 6' is assumed to be an ON/OFF signal of the switch.

Calculations in S000 and S100 are the same as those in the first embodiment described above.

In S250, the longitudinal acceleration control permission flag FOK is created. The longitudinal acceleration control permission flag FOK is set to 1 if (the switch ON/OFF signal GSW is ON) and is set to 0 under other conditions. When the shift position is input as described above, the longitudinal acceleration control permission flag FOK is set to 1 if (the switch ON/OFF signal GSW is ON) and (the shift position is in the D-range), and is set to 0 under other conditions. After the calculation, the procedure goes to S350.

Figure 23:
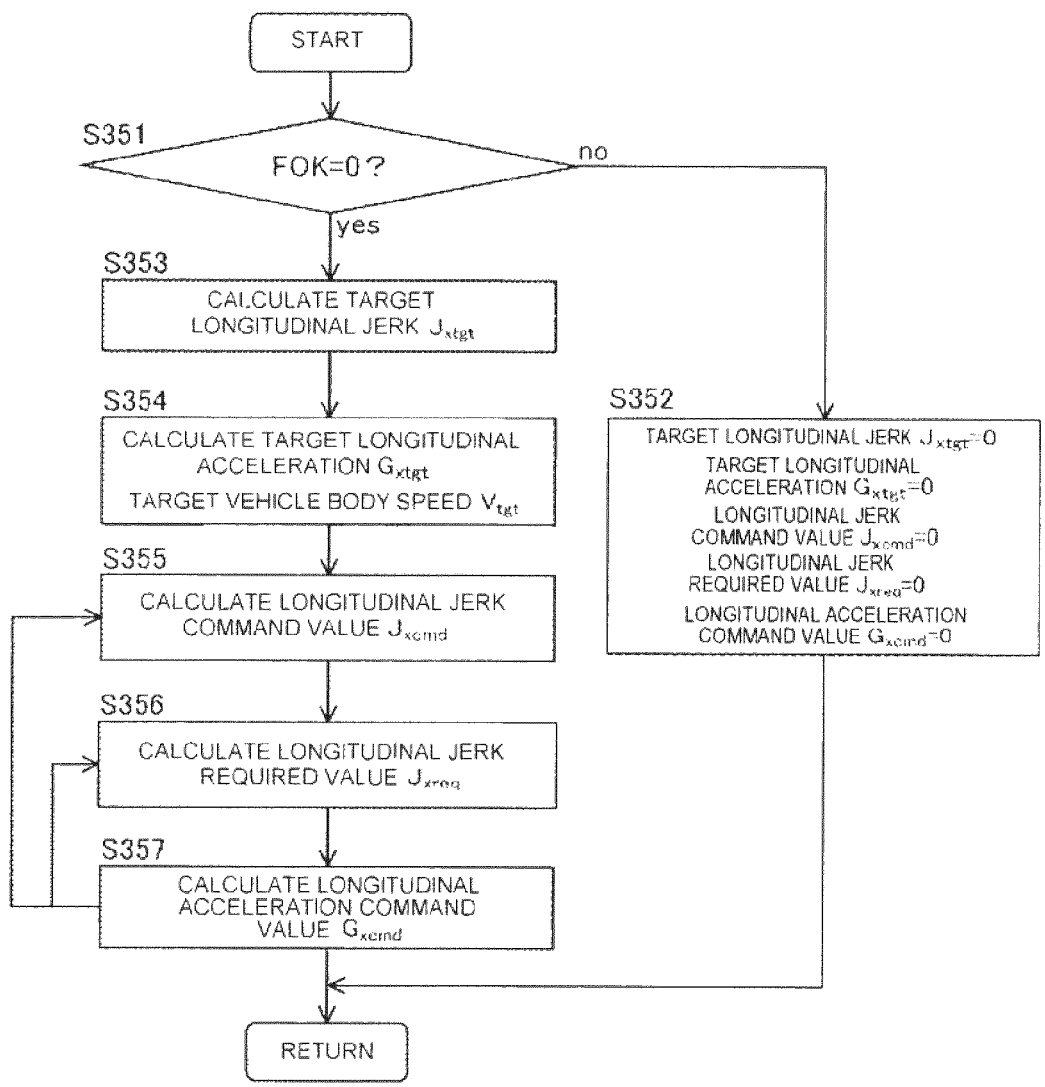
FIG. 23 is a drawing illustrating a calculation flowchart of the vehicle motion control command calculating unit in FIG. 21.

In S350, calculation of the longitudinal acceleration command value $G_{xcmd}$ is performed. FIG. 23 illustrates a calculation flowchart C2 of the longitudinal acceleration command value $G_{xcmd}$.

In S351, the longitudinal acceleration control permission flag FOK is determined. If the longitudinal acceleration control permission flag FOK is 0, the procedure goes to S352, and if it is not 0, the procedure goes to S353.

In S352, the target longitudinal jerk $J_{xtgt}$, the target longitudinal acceleration $G_{xtgt}$, the longitudinal jerk command value $J_{xcmd}$, the longitudinal jerk required value $J_{xreq}$, and the longitudinal acceleration command value $G_{xcmd}$ are set to zero and the procedure goes to S450.

Figure 24:
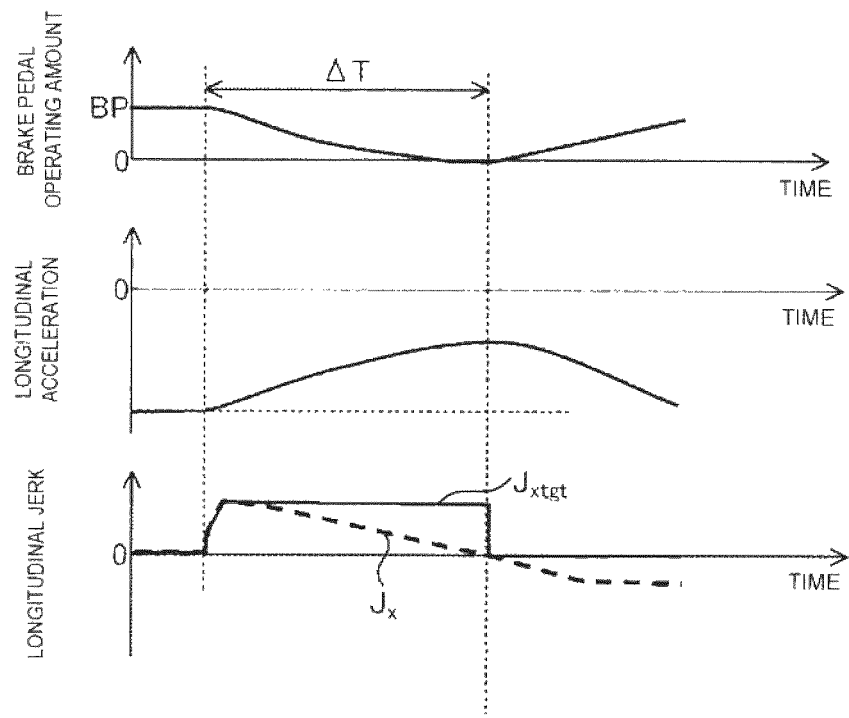
FIG. 24 is a drawing illustrating a relationship between a brake pedal operating amount by a driver and a target longitudinal jerk in the vehicle motion control apparatus FIG. 21.
Figure 25:
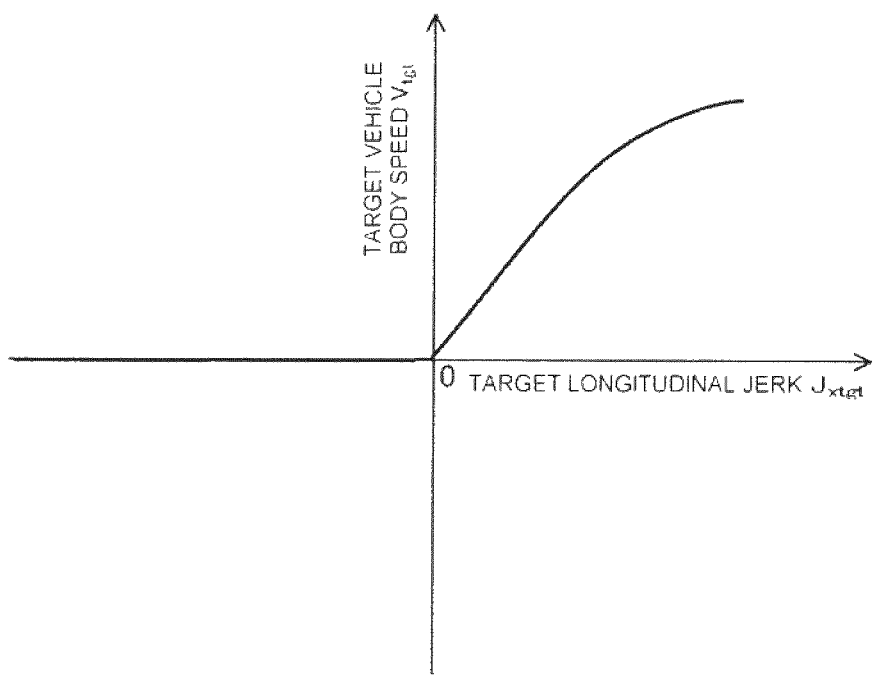
FIG. 25 is a drawing illustrating a relationship between the target longitudinal jerk and a target longitudinal acceleration in the vehicle motion control apparatus FIG. 21.

In S353, the target longitudinal jerk $J_{xtgt}$ is calculated on the basis of the longitudinal jerk $J_x$ and the brake pedal operating amount BP. As a method of calculating the target longitudinal jerk $J_{xtgt}$, as illustrated in FIG. 24, the maximum value of the longitudinal jerk $J_x$ generated in the period ΔT from a moment when the brake pedal operating amount BP starts to be reduced to a moment reaching zero is defined as the target longitudinal jerk $J_{xtgt}$, and the target longitudinal jerk $J_{xtgt}$ is set to 0 when the brake pedal operating amount BP starts to increase. Here, the target longitudinal jerk $J_{xtgt}$ may be an average value in the period ΔT instead of being the minimum value in the same period.

Also, it is also possible to define values filtered by time constants different between a direction in which the value of the longitudinal acceleration $J_x$ is reduced and a direction in which the same is increased as $J_{xtgt}$ and the time constant in the reducing direction may be set to be a very large value in comparison with the time constant in the increasing direction.

The longitudinal jerk to be generated may be estimated on the basis of the temporal change of the brake pedal operating amount BP, and the target longitudinal jerk $J_{xtgt}$ may be created by using one of these estimated values $J_{xBP}$ and $J_x$ having a larger absolute value. When a vertical gradient of a road surface is estimated from a differential between the longitudinal acceleration $G_x$ and the longitudinal acceleration $G_{xv}$ obtained by differentiating the vehicle speed V and it is determined to be on a rising slope or on a downhill slope not lower than a certain threshold value, the target longitudinal jerk $J_{xtgt}$ may be created on the basis of $J_{xBP}$. After the calculation, the procedure goes to S354.

In S354, the target longitudinal acceleration $G_{xtgt}$ and the target vehicle speed $V_{tgt}$ are calculated on the basis of the target longitudinal jerk $J_{xtgt}$. As a method of calculating the target longitudinal acceleration $G_{xtgt}$, as illustrated in FIG. 11, the target longitudinal jerk $J_{xtgt}$ and the target longitudinal acceleration $G_{xtgt}$ have the same sign and are set so that the absolute value of the target longitudinal acceleration $G_{xtgt}$ increases with an increase of the target longitudinal jerk $J_{xtgt}$.

The target vehicle speed $V_{tgt}$ increases in accordance with the target longitudinal jerk $J_{xtgt}$ if the target longitudinal jerk $J_{xtgt}$ is a positive value and is 0 if it is a negative value. After the calculation, the procedure goes to S355.

In S355, the longitudinal jerk command value $J_{xcmd}$ is calculated on the basis of the target longitudinal jerk $J_{xtgt}$, the target longitudinal acceleration $G_{xtgt}$, the brake pedal operating amount BP, and the previous value $G_{xcmd\_z1}$ of the longitudinal acceleration command value. The longitudinal jerk command value $J_{xcmd}$ is given by the following expression (3). After the calculation, the procedure goes to S306.

[Expression 3]

$$J_{xcmd} = J_{xtgt}\{(BP=0 \text{ or } J_x \leq 0) \text{ and } (|G_{xcmd\_z1}| \leq |G_{xtgt}|)\} J_{xcmd} = 0 \text{(under conditions other than those described above)} \quad (3)$$

In S356, the longitudinal jerk required value $J_{xreq}$ is calculated on the basis of the lateral acceleration $G_y$, the lateral jerk Jy, the accelerator pedal operating amount AP, the brake pedal operating amount BP, and the previous value $G_{xcmd\_z1}$ of the longitudinal acceleration command value $G_{xcmd}$. The longitudinal jerk required value $J_{xreq}$ is given by using the longitudinal jerk required value (accelerator) $J_{xreqAP}$, the longitudinal jerk required value (brake) $J_{xreqBP}$, and the longitudinal jerk required value (lateral jerk) $J_{xreqJy}$ illustrated in FIG. 16 to FIG. 20 described above by the following expression (4). After the calculation, the procedure goes to S357.

[Expression 4]

$$J_{xreq} = J_{xreqAP} + J_{xreqBP} + J_{xreqJy} \quad (4)$$

In S357, the longitudinal acceleration command value $G_{xcmd}$ is calculated on the basis of the vehicle speed V, the target vehicle speed $V_{tgt}$, the longitudinal jerk command value $J_{xcmd}$, the longitudinal jerk required value $J_{xreq}$, and the previous value $G_{xcmd\_z1}$ of the longitudinal acceleration command value $G_{xcmd}$. The longitudinal acceleration command value $G_{xcmd}$ is calculated by performing an upper and lower limit value processing which provides a value obtained by integrating a value obtained by adding the longitudinal jerk command value $J_{xcmd}$ and the longitudinal jerk required value $J_{xreq}$ with a lower limit value of 0 and an upper limit value of the longitudinal acceleration command upper limit value $G_{xcmdlmtH}$ illustrated in FIG. 20 described above.

The longitudinal acceleration command upper limit value 1 which is independent from the differential $\Delta V_{tgt}$ of the vehicle speed V and the target vehicle speed $V_{tgt}$ may be a preset value, a value set on the basis of the acceleration absolute value $|G_{max}|$ which may be generated on the road surface, and a value set on the basis of the acceleration absolute value $|G_{strlmt}|$ considering also turning responsiveness at the time of steering.

Figure 26:
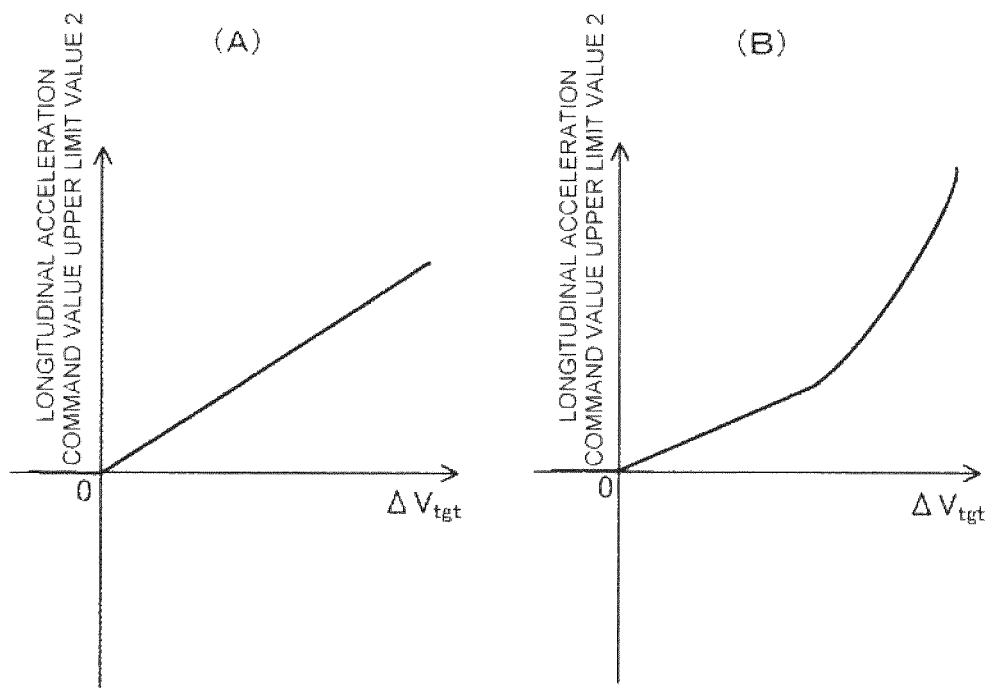
FIG. 26 is a drawing illustrating a relationship between a differential between a vehicle speed and a target vehicle speed and an upper limit value 2 of a longitudinal acceleration command value in the vehicle motion control apparatus FIG. 21.

The $|G_{max}|$ and $|G_{strlmt}|$ which may be generated here may be estimated from the relationship between the wheel speed changes of the respective wheels and the longitudinal acceleration $G_x$. The longitudinal acceleration command upper limit value 2 depending on $\Delta V_{tgt}$ is set so as to be 0 when $\Delta V_{tgt}$ is 0 or lower and increased in value with an increase of $\Delta V_{tgt}$ as illustrated in FIG. 26.

Here, as a method of increasing the value with the increase of $\Delta V_{tgt}$, setting so as to be increased linearly as illustrated in FIG. 26(A) or setting so as to be increased along a curve projecting downward as illustrated in FIG. 26(B) is also applicable. After the calculation, the procedure goes to S450.

In S450, a command value which realizes the longitudinal acceleration command value $G_{xcmd}$ if the longitudinal acceleration control permission flag FOK is 1 and a command value which does not perform the longitudinal acceleration control if the longitudinal acceleration control permission flag FOK is 0 is transmitted to the longitudinal acceleration generating means 8 and the longitudinal acceleration control state display means 9.

Here, the signal to be transmitted to the longitudinal acceleration generating means 8 when the longitudinal acceleration control permission flag FOK is 1 is transmitted with the longitudinal acceleration command value $G_{xcmd}$ as a control command value when the longitudinal acceleration command value $G_{xcmd}$ can be realized by the longitudinal acceleration generating means 8 by transmitting the longitudinal acceleration command value $G_{xcmd}$ as described above. If the command value in accordance with the longitudinal acceleration generating means 8 is needed, the command value controlling the longitudinal acceleration generating means 8 is created on the basis of the longitudinal acceleration command value $G_{xcmd}$ and is transmitted. For example, when the longitudinal acceleration generating means 8 is the engine and performs the longitudinal acceleration control by transmitting an engine torque command value to the engine controller, the engine torque command value is created on the basis of the longitudinal acceleration command value $G_{xcmd}$ and the created engine torque command value is transmitted as a control command value. Accordingly, the longitudinal acceleration on the basis of the longitudinal acceleration command value $G_{xcmd}$ is generated in the vehicle.

Also, as described above, a command for realizing the longitudinal acceleration command value may be transmitted to the plurality of longitudinal acceleration generating means 8. For example, when the motor and the engine described above constitute the longitudinal acceleration generating means 8, a configuration in which a constant longitudinal acceleration command value is transmitted to the engine, increment or decrement of the longitudinal acceleration command value on the basis of the lateral jerk is transmitted to the motor, so that the longitudinal acceleration generated finally in the vehicle becomes the longitudinal acceleration command value $G_{xcmd}$ is also applicable.

As a command value to the longitudinal acceleration control state display means 9, for example, if the longitudinal acceleration control permission flag FOK is 1, a drive command value is transmitted to a display device to notify the driver of the fact that the longitudinal acceleration control is performed by the brake pedal operation, and when the longitudinal acceleration control by the longitudinal acceleration command value $G_{xcmd}$ is in execution, a drive command value to notify the driver of the fact that the control is in execution is transmitted to the display device or the sound generator. The drive command value may be transmitted so that the output of the display device or the sound generator changes in accordance with the magnitude of the longitudinal acceleration command value $G_{xcmd}$.

As described above, in the present invention, by controlling the longitudinal acceleration on the basis of the longitudinal jerk generated by the brake pedal operation performed by the driver, a range of the longitudinal acceleration which can be generated by the driver with the brake pedal may be effectively widened, so that the step changing operation of the pedal may be reduced.

According to the description of an input signal to the vehicle motion control apparatus 1" of this embodiment, the signals obtained by the acceleration and jerk information acquiring means 2 are assumed to be the longitudinal acceleration and the lateral acceleration, the signal obtained by the vehicle speed acquiring means 3 is assumed to be the wheel speeds of the respective wheels, the signal obtained by the accelerator pedal operating amount acquiring means 4 is assumed to be the accelerator pedal stroke, the signal acquired by the brake pedal operating amount acquiring means 5 is assumed to be the brake pressure, and the signal obtained by the longitudinal acceleration control switch 6' is assumed to be the ON/OFF signal of the switch. However, the present invention is not necessarily limited to the case where all of these signals are input.

For example, as the input signal to the vehicle motion control apparatus 1", the signal obtained by the acceleration and jerk information acquiring means 2 is limited to the lateral acceleration, and the target longitudinal jerk $J_{xtgt}$ may be calculated from $J_{xBP}$, which is a temporary change of the brake pedal operating amount BP.

Alternatively, a configuration in which the calculation of the longitudinal acceleration command value on the basis of the accelerator pedal operating amount described in the first embodiment described above is also integrated in the vehicle motion control command calculating means 7' and the acceleration control by the brake pedal and the deceleration control by the accelerator pedal are switched by a switch is also applicable.

In contrast, a configuration in which the calculation of the longitudinal acceleration command value on the basis of the brake pedal operating amount of the third embodiment is also integrated in the sensor signal calculating means 12 of the second embodiment described above, and the acceleration control by the brake pedal and the deceleration control by the accelerator pedal are switched by the switch is also applicable.

The invention claimed is:

1. A vehicle motion control apparatus, comprising:
   motional state information acquiring means configured to acquire a first longitudinal acceleration, a lateral acceleration and a vehicle speed of a vehicle;
   pedal operating amount acquiring means configured to acquire information on a pedal operation performed by a driver;
   vehicle motion control command calculating means configured to:
   calculate a longitudinal acceleration command value on the basis of information acquired from the motional state information acquiring means and the pedal operating amount acquiring means, and
   output a command value indicating the calculated longitudinal acceleration command value,
   wherein
   when a quantity of pedal operation is zero, a second longitudinal acceleration is generated based on the calculated longitudinal acceleration command value and a first longitudinal jerk generated on the basis of a pedal opening operation performed by the driver, such that the second longitudinal acceleration provides a second longitudinal jerk having a value comparable to the first longitudinal jerk.

2. The vehicle motion control apparatus according to claim 1, wherein an absolute value of the calculated longitudinal acceleration command value increases with an increase of an absolute value of the first longitudinal jerk generated on the basis of the pedal opening operation performed by the driver.

3. The vehicle motion control apparatus according to claim 1, wherein the vehicle motion control command calculating means changes an absolute value of the longitudinal acceleration command value on the basis of a lateral jerk acquired by the motional state information acquiring means or calculated from the information acquired from the motional state information acquiring means and the pedal operating amount acquiring means.

4. The vehicle motion control apparatus according to claim 1, wherein when the longitudinal acceleration command value is a negative value and the vehicle speed acquired by the motional state information acquiring means is not higher than a predetermined vehicle speed, an absolute value of the longitudinal acceleration command value is reduced with a reduction of the vehicle speed.

5. The vehicle motion control apparatus according to claim 1, wherein when the longitudinal acceleration command value is a negative value, and when an absolute value of a brake-based longitudinal acceleration required value generated by a brake pedal operation amount generated from the pedal operation information is not less than an absolute value of the longitudinal acceleration command value, the absolute value of the longitudinal acceleration command value is reduced on the basis of the reduction of the brake pedal operation amount.

6. The vehicle motion control apparatus according to claim 1, wherein when the longitudinal acceleration command value is a positive value, an absolute value of the longitudinal acceleration command value is reduced with a reduction of a value obtained by subtracting the vehicle speed acquired by the motional state information acquiring means from a preset target vehicle speed on the basis of the first longitudinal jerk generated on the basis of the pedal opening operation performed by the driver.

7. The vehicle motion control apparatus according to claim 1, wherein when the longitudinal acceleration command value is a positive value, a longitudinal jerk required value is generated on the basis of a brake pedal operating speed generated from a brake pedal operating amount generated from the pedal operation information, and the longitudinal acceleration command value is generated on the basis of the longitudinal jerk required value.

8. The vehicle motion control apparatus according to claim 1, wherein the vehicle motion control command calculating means calculates the longitudinal acceleration command value by:
   calculating a longitudinal jerk command value generated on the basis of a third longitudinal jerk estimated from an accelerator pedal opening operation performed by the driver, an accelerator-based longitudinal jerk required value generated on the basis of a fourth longitudinal jerk estimated from an accelerator pedal pressing operation performed by the driver, a brake-based longitudinal jerk required value generated on the basis of a fifth longitudinal jerk estimated from a brake pedal pressing operation performed by the driver, and a lateral jerk-based longitudinal jerk required value created on the basis of a temporal change of a lateral jerk-based longitudinal acceleration required value created on the basis of a lateral jerk generated by a handle operation performed by the driver, and
   performing temporal integration on a value obtained by adding the calculated longitudinal jerk command value, the calculated accelerator-based longitudinal jerk required value, the calculated brake-based longitudinal jerk required value, and the calculated lateral jerk-based longitudinal jerk required value.

9. The vehicle motion control apparatus according to claim 1, wherein the vehicle motion control command calculating means calculates a deceleration-based negative longitudinal acceleration command value on the basis of a longitudinal jerk generated by an accelerator pedal operation performed by the driver.

10. The vehicle motion control apparatus according to claim 1, wherein the vehicle motion control command calculating means is configured to:
    calculate, when the longitudinal acceleration command value is a negative value, a longitudinal jerk required value on the basis of an accelerator pedal operating amount generated from the pedal operating information acquired by the pedal operating amount acquiring means, and
    change the longitudinal acceleration command value on the basis of the calculated longitudinal jerk required value.

11. The vehicle motion control apparatus according to claim 1, wherein the vehicle motion control command calculating means is configured to:
    calculate, when the longitudinal acceleration command value is a negative value, a longitudinal acceleration required value on the basis of a brake pedal operating amount generated from the pedal operation information acquired by the pedal operating amount acquiring means,
    calculate, when an absolute value of the calculated longitudinal acceleration required value is not lower than an absolute value of the longitudinal acceleration command value, a longitudinal jerk required value on the basis of a temporal change of the longitudinal acceleration required value, and
    change the longitudinal acceleration command value on the basis of the calculated longitudinal jerk required value.

12. The vehicle motion control apparatus according to claim 3, wherein the vehicle motion control command calculating means is configured to:
    calculate, when the longitudinal acceleration command value is a negative value, a longitudinal acceleration required value on the basis of the lateral jerk,
    calculate, when an absolute value of the calculated longitudinal acceleration required value is not lower than the absolute value of the longitudinal acceleration command value, a longitudinal jerk required value from a temporal change of the longitudinal acceleration required value, and
    change the longitudinal acceleration command value on the basis of the calculated longitudinal jerk required value.

13. The vehicle motion control apparatus according to claim 1, wherein:
    the motional state information acquiring means includes:
        acceleration and jerk information acquiring means configured to acquire anyone of the first longitudinal acceleration, the lateral acceleration, the first longitudinal jerk and a lateral jerk of the vehicle; and
        vehicle speed acquiring means configured to acquire the vehicle speed of the vehicle,
    the pedal operating amount acquiring means includes:
        accelerator pedal operating amount acquiring means configured to acquire an accelerator pedal stroke performed by the driver; and
        brake pedal operating amount acquiring means configured to acquire a brake pressure applied by the driver, and
    the pedal operation information includes the accelerator pedal stroke and the brake pressure.

14. The vehicle motion control apparatus according to claim 13, further comprising:
    longitudinal acceleration control detecting means configured to detect ON or OFF of longitudinal acceleration control and output a longitudinal acceleration control detection signal.

15. The vehicle motion control apparatus according to claim 14, wherein the vehicle motion control command calculating means is configured to:
    acquire the first longitudinal acceleration, the lateral acceleration, the vehicle speed, the accelerator pedal stroke, the brake pressure, and the longitudinal acceleration control detection signal,
    calculate the first longitudinal jerk and the lateral jerk from the first longitudinal acceleration, the lateral acceleration, and the vehicle speed,
    calculate an accelerator pedal operating amount and a brake pedal operating amount from the accelerator pedal stroke and the brake pressure,
    generate a longitudinal acceleration control permission flag on the basis of the vehicle speed and the longitudinal acceleration control detection signal,
    calculate the longitudinal acceleration command value on the basis of the vehicle speed, a value of the longitudinal acceleration control permission flag, the first longitudinal jerk, and the lateral jerk, and output a command value on the basis of the longitudinal acceleration command value on the basis of the value of the longitudinal acceleration control permission flag.

16. A vehicle motion control system, comprising a vehicle motion control apparatus, the vehicle motion control apparatus including:

motional state information acquiring means configured to acquire a first longitudinal acceleration, a lateral acceleration and a vehicle speed of a vehicle;

pedal operating amount acquiring means configured to acquire information on pedal operation performed by a driver;

vehicle motion control command calculating means configured to calculate a longitudinal acceleration command value on the basis of information acquired from the motional state information acquiring means and the pedal operation amount acquiring means and output a command value indicating the calculated longitudinal acceleration command value;

longitudinal acceleration generating means configured to perform longitudinal acceleration control on the vehicle on the basis of the command value output from the vehicle motion control command calculating means; and longitudinal acceleration control state display means configured to indicate information recognizable by the driver on the basis of the command value output from the vehicle motion control command calculating means, wherein when a quantity of pedal operation is zero, a second longitudinal acceleration is generated based on the calculated longitudinal acceleration command value and a first longitudinal jerk generated on the basis of a pedal opening operation performed by the driver, such that the second longitudinal acceleration provides a second longitudinal jerk having a value comparable to the first longitudinal jerk.

17. The vehicle motion control system according to claim 16, further comprising:

a vehicle control apparatus configured to receive an input of the command value output from the vehicle motion control command calculating means, generate and output a drive signal for driving the longitudinal acceleration generating means and the longitudinal acceleration control state display means on the basis of the input command value.

18. The vehicle motion control system according to claim 16, wherein the vehicle motion control apparatus is configured to control such that an absolute value of the calculated longitudinal acceleration command value increases with an increase of an absolute value of the first longitudinal jerk generated on the basis of the pedal opening operation performed by the driver.

19. The vehicle motion control system according to claim 16, wherein the vehicle motion control command calculating means of the vehicle motion control apparatus is configured to change an absolute value of the longitudinal acceleration command value on the basis of a lateral jerk acquired by the motional state information acquiring means or calculated from the information acquired from the motional state information acquiring means and the pedal operating amount acquiring means.

20. The vehicle motion control system according to claim 16, wherein the vehicle motion control command calculating means of the vehicle motion control apparatus is configured to calculate a negative longitudinal acceleration command value on the basis of a longitudinal jerk generated by an accelerator pedal operation performed by the driver.

* * * * *